United States Patent
Arakane et al.

(10) Patent No.: US 11,554,583 B2
(45) Date of Patent: Jan. 17, 2023

(54) PRINTING APPARATUS

(71) Applicant: BROTHER KOGYO KABUSHIKI KAISHA, Nagoya (JP)

(72) Inventors: Satoru Arakane, Nagoya (JP); Masao Mimoto, Kitanagoya (JP); Tsuyoshi Ito, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 127 days.

(21) Appl. No.: 17/199,556

(22) Filed: Mar. 12, 2021

(65) Prior Publication Data
US 2021/0300035 A1 Sep. 30, 2021

(30) Foreign Application Priority Data
Mar. 24, 2020 (JP) .............................. JP2020-052701

(51) Int. Cl.
*B41J 2/045* (2006.01)
*H04N 1/60* (2006.01)
*B41J 2/21* (2006.01)

(52) U.S. Cl.
CPC ......... *B41J 2/04586* (2013.01); *B41J 2/2132* (2013.01); *H04N 1/6019* (2013.01)

(58) Field of Classification Search
CPC .... B41J 2/04586; B41J 2/2132; H04N 1/6019
See application file for complete search history.

(56) References Cited

U.S. PATENT DOCUMENTS 8,605,330 B2 * 12/2013 Fujita ..................... B41J 2/2132
358/1.9
2017/0274643 A1 9/2017 Takeuchi et al.
2018/0213125 A1 7/2018 Takeuchi et al.

FOREIGN PATENT DOCUMENTS

JP 2017-170719 A 9/2017
JP 2018-118382 A 8/2018

* cited by examiner

*Primary Examiner* — Thinh H Nguyen
(74) *Attorney, Agent, or Firm* — Scully, Scott, Murphy & Presser, PC

(57) ABSTRACT

A printing apparatus includes a print execution section and a controller. The print execution section includes: a printing head having nozzles arranged in a first direction; a head driver that drives the printing head to discharge ink from the nozzles thereby forming dots on a printing medium; and a movement mechanism that moves the printing medium relative to the printing head in any of the first direction and a second direction intersecting with the first direction. The controller obtains a piece of object image data, generates, by using the object image data, a plurality of pieces of dot data indicating formation states of the dots for pixels, and prints a printing image by causing the print execution section to execute discharge of the ink and movement of the printing medium by use of the pieces of dot data.

17 Claims, 13 Drawing Sheets

PRINTING MODE A
600dpi x 300dpi

PRINTING MODE A
600dpi x 300dpi

OVERLAP
DIMENSION LARGE

Fig. 6A
PRINTING MODE B
600dpi x 600dpi
Fig. 6B
PRINTING MODE B
600dpi x 600dpi
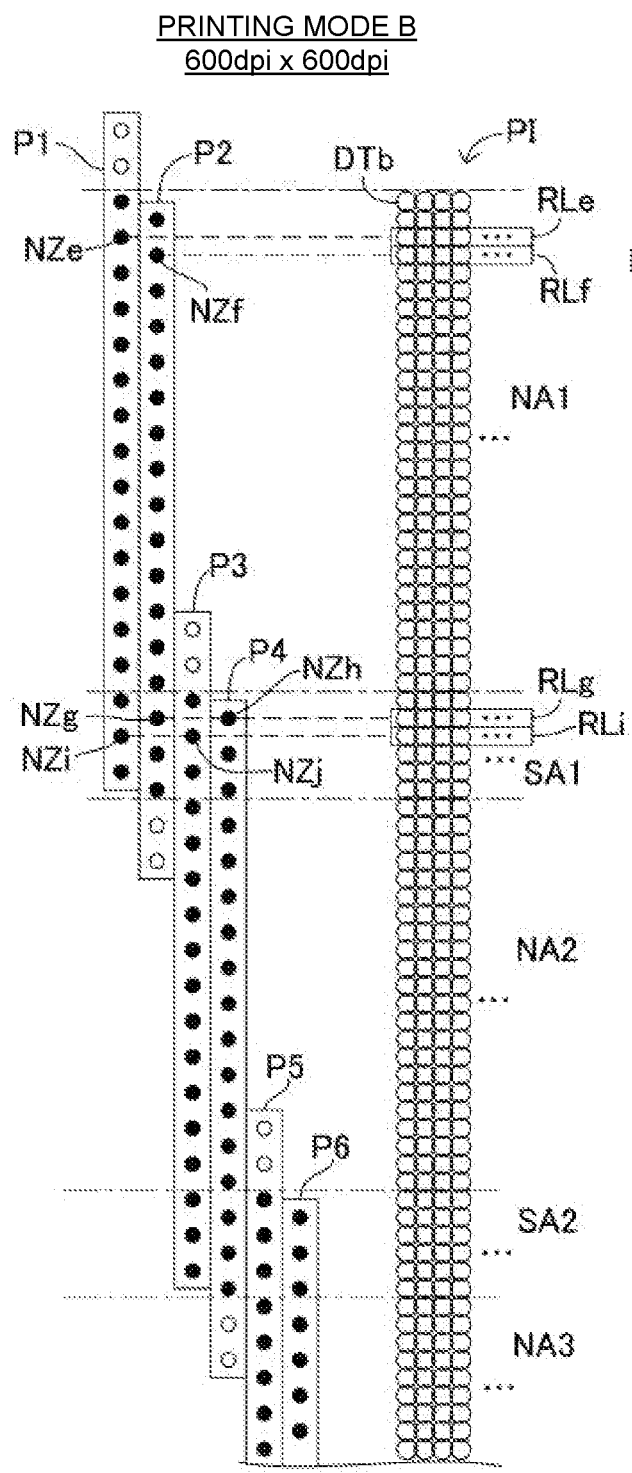
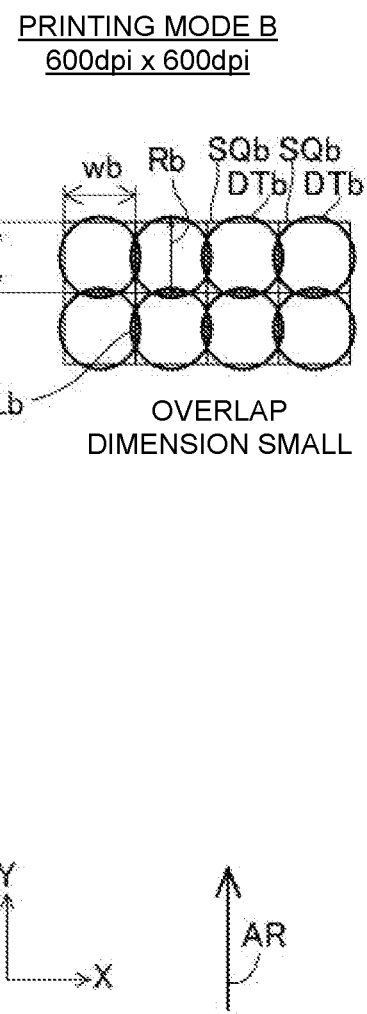
OVERLAP DIMENSION SMALL

PATTERN DATA

RECORDING RATIO

PRINTING MODE C  600dpi x 600dpi

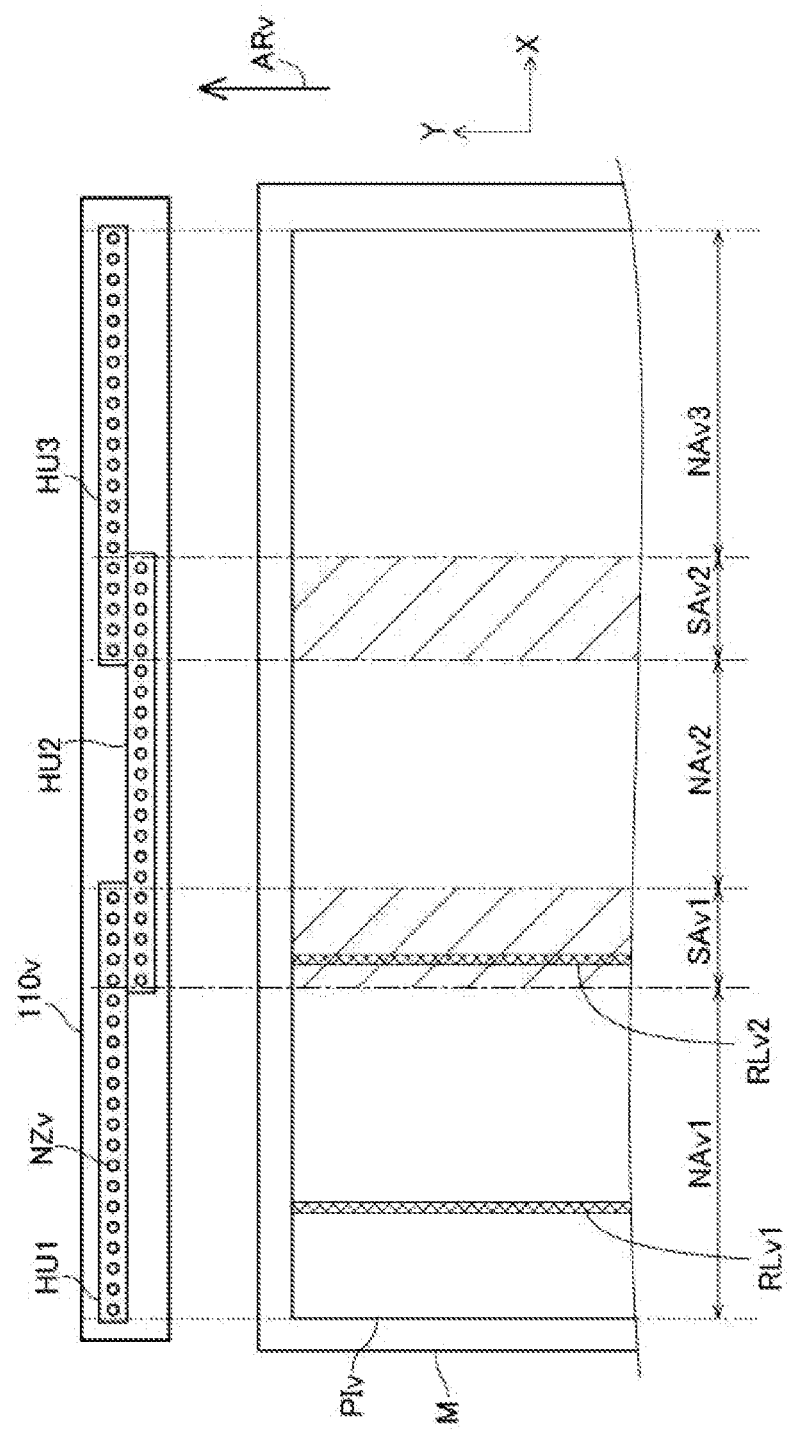

PRINTING APPARATUS

CROSS REFERENCE TO RELATED APPLICATION

The present application claims priority from Japanese Patent Application No. 2020-052701 filed on Mar. 24, 2020, the disclosure of which is incorporated herein by reference in its entirety.

BACKGROUND

Field of the Invention

The present specification relates to a printing apparatus including a print execution section and a controller.

Description of the Related Art

There is known a printer in which, when printing is executed by passes, a part of area in the vicinity of a boundary between bands is printed by two passes and any other areas are printed by one pass. Dots forming a raster line in a joint area printed by two passes are formed by using two nozzles. Dots forming a raster line in a normal area printed by one pass are formed by using one nozzle. In the printer, a look-up table used for a color conversion process in the joint area is different from a look-up table used for the color conversion process in the normal area. This reduces color unevenness (color irregularity) caused between the normal area and the joint area.

SUMMARY

However, the liability to cause the color unevenness depends on a material of a printing medium, temperature, and humidity in the above technique, and a difference in color unevenness between printing modes is not considered sufficiently in the above technique. Thus, the color unevenness may not be reduced in a certain printing mode.

The present specification discloses a technique that is capable of effectively inhibiting color unevenness caused between areas, depending on a printing mode.

According to the first aspect of the present disclosure, there is provided a printing apparatus, including:
a print execution section; and
a controller,
wherein the print execution section includes:
a printing head having a plurality of nozzles arranged in a first direction, an ink having a specified color being discharged from the nozzles;
a head driver configured to drive the printing head to form a plurality of dots having the specified color on a printing medium by discharging the ink having the specified color from the nozzles; and
a movement mechanism configured to move the printing medium relative to the printing head in any of the first direction and a second direction intersecting with the first direction,
wherein the controller is configured to:
obtain a piece of object image data;
generate, by using the object image data, a plurality of pieces of dot data indicating formation states of the dots having the specified color, for a plurality of pixels; and
print a printing image by causing the print execution section to execute discharge of the ink having the specified color and movement of the printing medium by use of the pieces of dot data,
the printing image includes a plurality of raster lines, each of the raster lines including a part of the dots having the specified color, the part of the dots being arranged in the second direction,
the printing image includes two first areas and a second area positioned between the two first areas,
the raster lines include a plurality of first raster lines included in each of the two first areas and a plurality of second raster lines included in the second area,
the part of the dots having the specified color and forming each of the first raster lines are formed by one nozzle included in the nozzles and corresponding to each of the first raster lines,
the part of the dots having the specified color and forming each of the second raster lines are formed by two or more nozzles included in the nozzles and corresponding to each of the second raster lines,
the controller is configured to:
execute a first area process on a piece of first partial image data included in the object image data and corresponding to the first area, to generate a plurality of pieces of first partial dot data included in the pieces of dot data and corresponding to each of the two first areas, and
execute a second area process on a piece of second partial image data included in the object image data and corresponding to the second area, to generate a plurality of pieces of second partial dot data included in the pieces of dot data and corresponding to the second area,
in the second area process, the pieces of second partial dot data are generated so that an image of the second area is printed at a density equal to or less than a density in a case that the first area process is executed on the second partial image data,
the controller is configured to control the print execution section to print the printing image by a first printing mode and by a second printing mode,
a relative dot diameter of the second printing mode is larger than a relative dot diameter of the first printing mode,
the relative dot diameter is a ratio of a diameter of a maximum dot having the specified color to a minimum dot interval, the minimum dot interval indicating a smaller one of a dot interval in the first direction and a dot interval in the second direction, the dot intervals in the first and second directions being based on printing resolution, and
in a case that the controller executes the second area process for the printing by the second printing mode, the controller is configured to lower the density of the image in the second area larger as compared with a case that the controller executes the second area process for the printing by the first printing mode.

In the second area where the dots having the specified color and included in each of the raster lines are formed by two or more nozzles, a dot formed by a nozzle included in the two or more nozzles spreads over the printing medium first, and then another dot formed by another nozzle included in the two or more nozzles is formed to overlap with the dot formed first. A total dimension of the dots having the specified color in the second area is thus likely to be larger than a total dimension of the dots having the specified color in the first area. Even when an image is printed by using the same image data, the density of the image printed in the second area is likely to be higher than the density of the image printed in the first area. Here, the degree in increase of density of the image in the second area is larger as the relative dot diameter is larger. In the above configuration, the degree in reduction of the density of the image in the second area in the second area process executed when printing is executed by the second printing mode of which relative dot diameter is large is larger than that in the second area process executed when printing is executed by the first printing mode of which relative dot diameter is small. This allows the printing apparatus to print the image in the second area at an appropriate density depending on the printing mode. It is thus possible to effectively inhibit color unevenness between the first area and the second area depending on the printing mode.

According to the second aspect of the present disclosure, there is provided a printing apparatus, including:
a print execution section; and
a controller,
wherein the print execution section includes:
a printing head having a plurality of nozzles arranged in a first direction, an ink having a specified color being discharged from the nozzles;
a head driver configured to drive the printing head to form a plurality of dots having the specified color on a printing medium by discharging the ink having the specified color from the nozzles; and
a movement mechanism configured to move the printing medium relative to the printing head in any of the first direction and a second direction intersecting with the first direction,
wherein the controller is configured to:
obtain a piece of object image data;
generate, by using the object image data, a plurality of pieces of dot data indicating formation states of the dots having the specified color for a plurality of pixels; and
print a printing image by causing the print execution section to execute discharge of the ink having the specified color and movement of the printing medium by use of the pieces of dot data,
the printing image includes a plurality of raster lines, each of the raster lines including a part of the dots having the specified color, the part of the dots being arranged in the second direction,
the printing image includes two first areas and a second area positioned between the two first areas,
the raster lines include a plurality of first raster lines included in each of the two first areas and a plurality of second raster lines included in the second area,
the part of the dots having the specified color and forming each of the first raster lines are formed by one nozzle included in the nozzles and corresponding to each of the first raster lines,
the part of the dots having the specified color and forming each of the second raster lines are formed by two or more nozzles included in the nozzles and corresponding to each of the second raster lines,
the controller is configured to:
execute a first area process on a piece of first partial image data included in the object image data and corresponding to the first area, to generate a plurality of pieces of first partial dot data included in the pieces of dot data and corresponding to each of the two first areas; and
execute a second area process on a piece of second partial image data included in the object image data and corresponding to the second area, to generate a plurality of pieces of second partial dot data included in the pieces of dot data and corresponding to the second area,
in the second area process, the pieces of second partial dot data are generated so that an image of the second area is printed at a density equal to or less than a density in a case that the first area process is executed on the second partial image data,
the controller is configured to control the print execution section to print the printing image by a first printing mode and control the print execution section to print the printing image by a second printing mode,
an interval ratio of the first printing mode is closer to 1 than an interval ratio of the second printing mode, the interval ratio being a ratio of a dot interval in the second direction to a dot interval in the first direction, the dot intervals in the first and second directions being based on printing resolution, and
in a case that the controller executes the second area process for the printing by the second printing mode, the controller is configured to lower the density of the image in the second area larger as compared with a case that the controller executes the second area process for the printing by the first printing mode.

In the second area where the dots having the specified color and included in each of the raster lines are formed by two or more nozzles, a dot formed by a nozzle included in the two or more nozzles spreads over the printing medium first, and then another dot formed by another nozzle included in the two or more nozzles is formed to overlap with the dot formed first. A total dimension of the dots having the specified color in the second area is thus likely to be larger than a total dimension of the dots having the specified color in the first area. Even when an image is printed by using the same image data, the density of the image printed in the second area is likely to be higher than the density of the image printed in the first area. Here, the degree in increase of density of the image in the second area is smaller as the interval ratio is closer to 1. In the above configuration, the degree in reduction of the density of the image in the second area in the second area process executed when printing is executed by the second printing mode of which interval ratio is away from 1 is larger than that in the second area process executed when printing is executed by the first printing mode of which interval ratio is closer to 1. This allows the printing apparatus to print the image in the second area at an appropriate density depending on the printing mode. It is thus possible to effectively inhibit color unevenness between the first area and the second area depending on the printing mode.

According to the third aspect of the present disclosure, there is provided a printing apparatus, including:
a head configured to discharge ink; and
a controller,
wherein the controller is configured to execute:
an image obtaining process of obtaining an object image including a first partial image and a second partial image;
a printing process of printing an overlap area and a non-overlap area, the overlap area being included in the first partial image and overlapping with the second partial image, the non-overlap area being included in the first partial image and not overlapping with the second partial image; and
a correction process of correcting a density of the overlap area by reducing a consumption amount of the ink in the overlap area,
wherein the controller is configured to control the head by a first printing mode and by a second printing mode to execute printing,
wherein printing resolution of the first printing mode is higher than printing resolution of the second printing mode, wherein in a case that the controller executes the correction process for the printing by the second printing mode, the controller is configured to reduce the consumption amount of the ink in the overlap area larger as compared with a case that the controller executes the correction process for the printing by the first printing mode.

The technique disclosed in the present specification can be achieved in a variety of embodiments. For example, the technique disclosed in the present specification can be achieved in a printing apparatus, a method of controlling a printing apparatus, an image processing method, a computer program for achieving the methods or functions of the apparatus, a recording medium recording the computer program, and the like.

BRIEF DESCRIPTION OF THE DRAWINGS

FIGS. 6A and 6B each illustrate a printing mode B according to the first embodiment.

FIG. 13 illustrates a modified example.

DESCRIPTION OF THE EMBODIMENTS

[First Embodiment] <Configuration of Printer 200>

Figure 1:
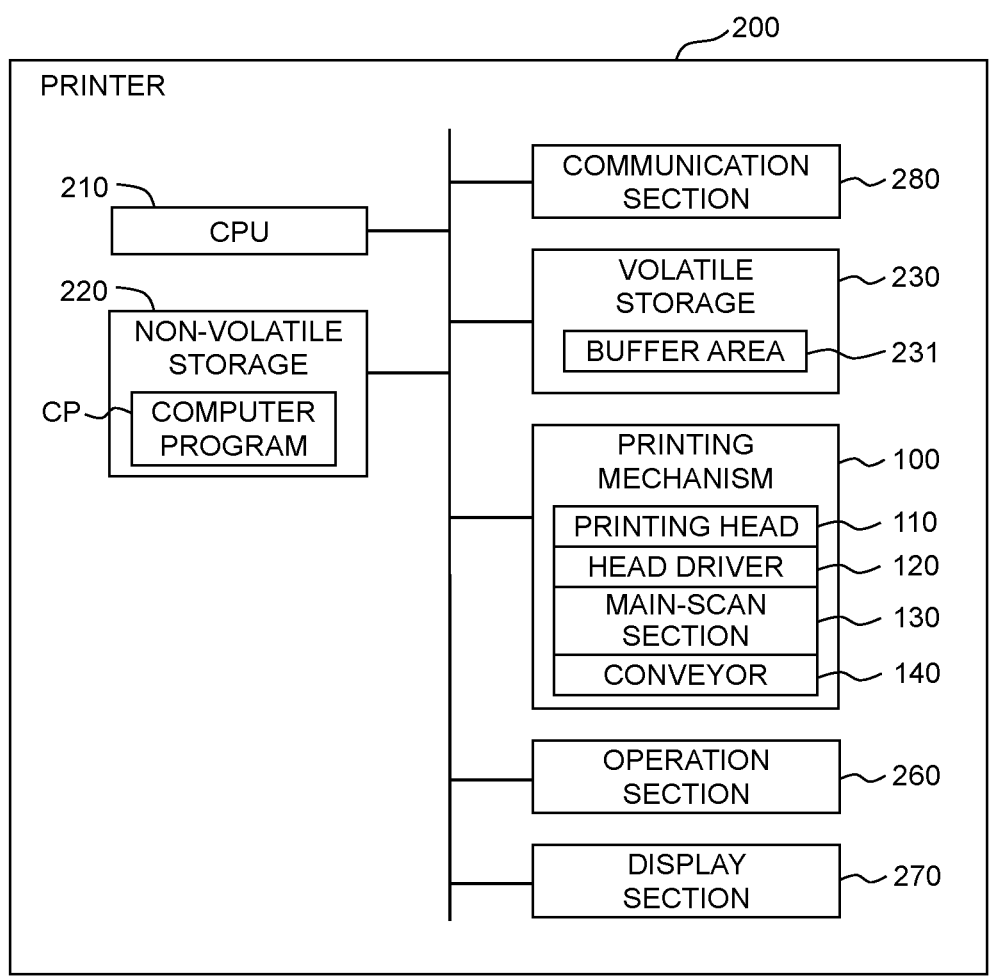
FIG. 1 is a block diagram of a configuration of a printer according to a first embodiment.
Figure 2A:
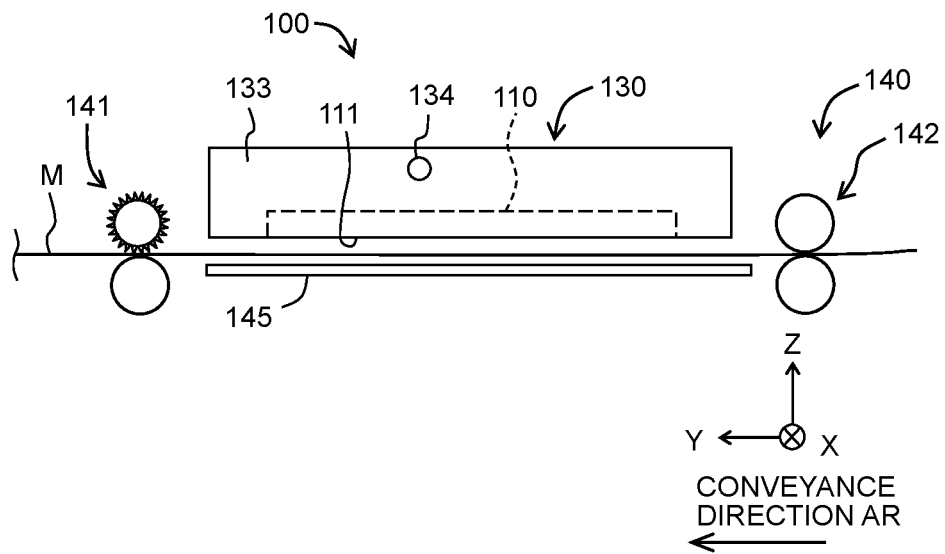
FIGS. 2A and 2B each depict a schematic configuration of a printing mechanism.
Figure 2B:
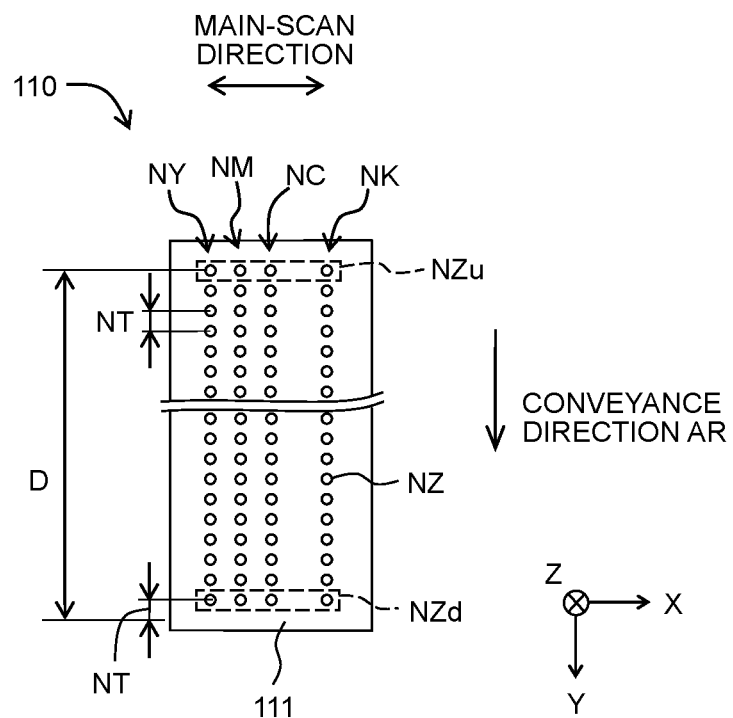

Referring to FIG. 1 to FIG. 2B, a configuration of a printer 200 is explained.

The printer 200 includes, for example, a printing mechanism 100 as a print execution section, a CPU 210 as a controller for the printing mechanism 100, a non-volatile storage 220 such as a hard disk drive, a volatile storage 230 such as a hard disk and flash memory, an operation section 260 for obtaining an operation instruction from a user such as buttons and a touch panel, a display section 270 such as a liquid crystal display, and a communication section 280. The printer 200 is connected to an external apparatus, such as a terminal apparatus (not depicted) of a user, via the communication section 280 so that the printer 200 can communicate with the external apparatus.

The volatile storage 230 provides a buffer area 231 that temporarily stores various intermediate data, which is generated when the CPU 210 executes a process. A computer program CP is stored in the non-volatile storage 220. In this embodiment, the computer program CP is a control program for controlling the printer 200. The computer program CP may be provided by being stored in the non-volatile storage 220 before shipment. The computer program CP may be provided by being downloaded from a server. Alternatively, the computer program CP may be provided by being stored in a DVD-ROM or the like. The CPU 210 executes a printing process described below by controlling, for example, the printing mechanism 100 through execution of the computer program CP.

The printing mechanism 100 executes printing by discharging respective inks (liquid droplets) of cyan (C), magenta (M), yellow (Y), and black (K). The printing mechanism 100 includes a printing head 110, a head driver 120, a main-scan section 130, and a conveyor 140.

As depicted in FIG. 2A, the main-scan section 130 includes a carriage 133 carrying the printing head 110 and a sliding shaft 134 that holds the carriage 133 so that the carriage 133 can reciprocate in a main-scan direction (X axis direction in FIG. 2A). The main-scan section 130 uses power of a main-scan motor (not depicted) to cause the carriage 133 to reciprocate along the sliding shaft 134. This results in main-scan in which the printing head 110 reciprocates in the main-scan direction with respect to a sheet M.

The conveyor 140 conveys the sheet M relative to the printing head 110 in a conveyance direction AR (+Y direction in FIGS. 2A and 2B) intersecting with the main-scan direction. As depicted in FIG. 2A, the conveyor 140 includes a sheet table 145, an upstream roller pair 142, and a downstream roller pair 141. In the following, an upstream side (−Y side) in the conveyance direction AR is simply referred to as an upstream side in some cases, and a downstream side (+Y side) in the conveyance direction AR is simply referred to as a downstream side in some cases.

The upstream roller pair 142 holds the sheet M at the upstream side (−Y side) with respect to the printing head 110. The downstream roller pair 141 holds the sheet M at the downstream side (+Y side) with respect to the printing head 110. The printing table 145 is disposed between the upstream roller pair 142 and the downstream roller pair 141 such that the printing table 145 faces a nozzle formation surface 111 of the printing head 110. The sheet M is conveyed by driving the downstream roller pair 141 and the upstream roller pair 142 by a conveyance motor (not depicted).

The head driver 120 (FIG. 1) supplies a driving signal to the printing head 110 while the main-scan section 130 executes the main-scan of the printing head 110, thus driving the printing head 110. The printing head 110 forms dots by discharging ink on the sheet conveyed by the conveyor 140 in accordance with the driving signal.

FIG. 2B depicts a configuration of the printing head 110 when seen from a −Z side (lower side in FIG. 2A). As depicted in FIG. 2B, nozzle rows formed by nozzles, that is, nozzle rows NC, NM, NY, and NK from which respective inks of C, M, Y, and K are discharged are formed in the nozzle formation surface 111 of the printing head 110. Each nozzle row includes the nozzles NZ arranged in the conveyance direction AR. The nozzles NZ have different positions in the conveyance orientation AR (+Y direction). The nozzles NZ are arranged in the conveyance direction AR at a predefined nozzle interval NT. The nozzle interval NT is a length in the conveyance direction AR between two nozzles NZ included in the nozzles NZ and adjacent to each other in the conveyance direction AR. The nozzles NZ included in the nozzles forming the nozzle rows and positioned at the most upstream side (−Y side) are also referred to as most upstream nozzles NZu. The nozzles NZ included in the nozzles forming the nozzle rows and positioned at the most downstream side (+Y side) are also referred to as most downstream nozzles NZd. A length obtained by adding the nozzle interval NT to a length in the conveyance direction AR from the most upstream nozzle NZu to the most downstream nozzle NZd is also referred to as a nozzle length D.

The positions in the main-scan direction (X direction in FIG. 2B) of the nozzle rows NC, NM, NY, and NK are different from each other. The positions in the conveyance direction AR (Y direction in FIG. 2B) of the nozzle rows NC, NM, NY, and NK overlap with each other. For example, the nozzle row NM is arranged in the +X direction with respect to the nozzle row NY from which ink Y is discharged, in the example of FIG. 2B.

<Printing Process>

Referring to FIG. 3 to FIG. 6B, the printing process is explained. The CPU 210 (FIG. 1) of the printer 200 executes the printing process based on a printing instruction from a user. The printing instruction includes designation of image data that indicates an image to be printed. In S110, the CPU 210 obtains image data designated by the printing instruction from the non-volatile storage 220. The image data is image data having various formats such as JPEG-compressed image data and image data described in a page-description language.

In S120, the CPU 210 rasterizes the obtained image data to generate RGB image data. The RGB image data as an object image data of this embodiment is thus obtained. The RGB image data is bitmap data including RGB values for each pixel. The RGB values are, for example, color values of a RGB color system including three component values of red (R), green (G), and blue (B).

The CPU 210 executes a printing data output process by using the RGB image data (S130). In the printing data output process, pieces of partial printing data are generated per partial printing SP described below, various kinds of control data are added to the pieces of partial printing data, and then the pieces of partial printing data are output to the printing mechanism 100. The control data includes data designating a conveyance amount of sheet conveyance T to be executed after the partial printing SP. In the printing data output process, the pieces of partial printing data are output by the number of times of the partial printing SP to be executed. Details of the printing data output process are explained below.

Accordingly, the CPU 210 causes the printing mechanism 100 to print a printing image PI. Specifically, the CPU 210 controls the head driver 120, the main-scan section 130, and the conveyor 140 to alternately execute the partial printing SP and the sheet conveyance T repeatedly a plurality of times. In the partial printing SP executed once, ink(s) is/are discharged from the nozzles NZ of the printing head 110 to the sheet M while the main-scan is executed once in a state where the sheet M is stopped on the printing table 145. A part of the image to be printed is thus printed on the sheet M. In the sheet conveyance T executed once, the sheet M is moved or conveyed in the conveyance direction AR by a predefined conveyance amount. In this embodiment, the CPU 210 causes the printing mechanism 100 to execute partial printing SP a plurality of times.

Figure 4:
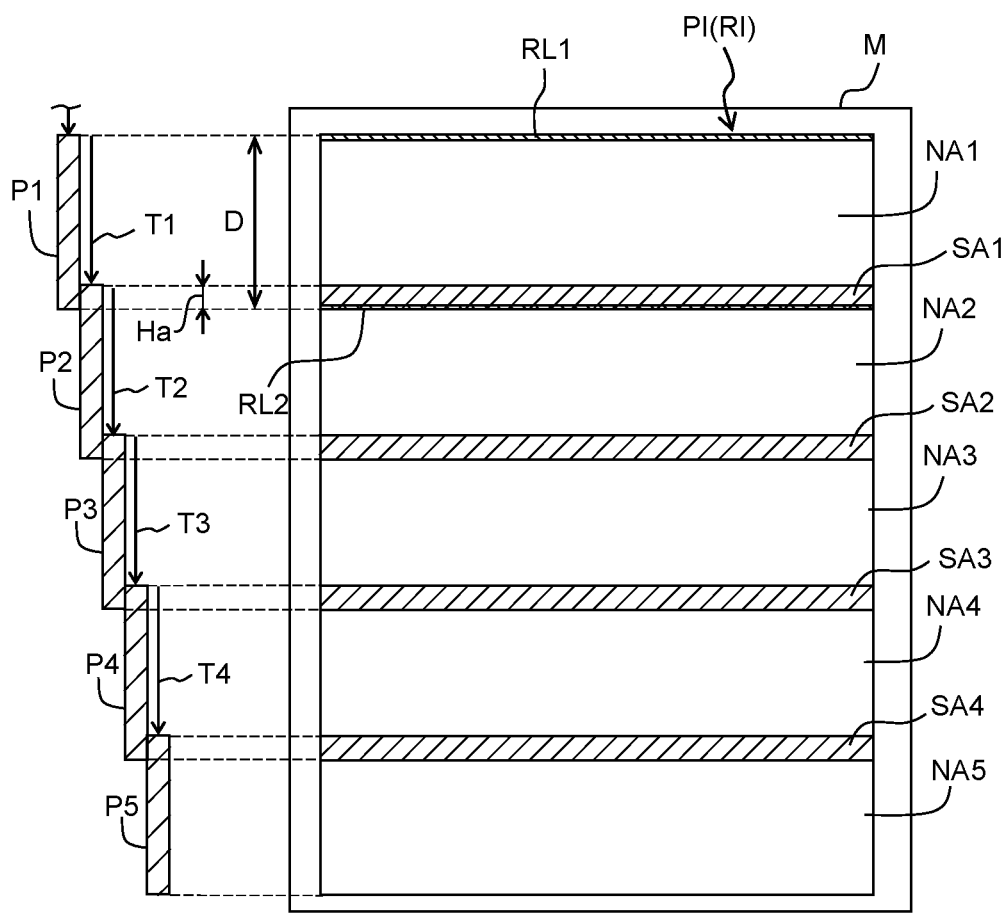
FIG. 4 depicts an example of a printing image to be printed on a sheet.

As depicted in FIG. 4, the printing image PI to be printed on the sheet M extends in the X direction (the main-scan direction at the time of printing). The printing image PI includes raster lines RL (e.g., RL1 in FIG. 4) that have different positions in the Y direction. Each raster line RL is a line in which dots may be formed in the X direction in FIG. 4. Each raster line of the printing image PI corresponds one-to-one to each raster line of an RGB image RI described below.

In this embodiment, two types of printing modes A and B are used. Although details are described below, the printing mode A is a non-interlaced mode in which so-called interlaced printing is not executed, and the printing mode B is a mode in which the interlaced printing is executed. FIG. 4 depicts a head position P in the printing mode A (i.e., a relative position in the conveyance direction of the printing head 110 relative to the sheet M) per partial printing SP (i.e., per main-scan). In the example of FIG. 4, the printing image PI is printed by executing the partial printing SP five times. A pass number k is assigned to the partial printing SP executed a plurality of times, in its execution order. The head position P where the k-th partial printing SP is executed is referred to as a head position Pk. The sheet conveyance T executed between the k-th partial printing SP and the (k+1)-th partial printing SP is also referred to as the k-th sheet conveyance Tk. FIG. 4 depicts head positions P1 to P5 and sheet conveyance T1 to T5 corresponding to the first partial printing SP to the fifth partial printing SP.

In FIG. 4, the printing image PI formed on the sheet M includes non-overlap areas NA (e.g., areas NA1 to NA5 not hatched in FIG. 4) and overlap areas SA (e.g., areas SA1 to SA4 hatched in FIG. 4).

In the non-overlap area NA, each raster line RL is printed by executing the partial printing once. For example, dots having a specified color (e.g., dots C) in each raster line RL in the non-overlap areas NA1 to NA5 in FIG. 4 are formed by one nozzle included in the nozzle row NC and corresponding to said each raster line RL.

In the overlap area SA, the raster line RL is printed by executing the partial printing twice. For example, dots having a specified color (e.g., dots C) in each raster line RL in the overlap areas SA1 to SA4 in FIG. 4 are formed by two nozzles included in the nozzle row NC and corresponding to said each raster line RL. In the example of FIG. 4, the two nozzles corresponding to the raster line RL2 in the overlap area SA1 are a nozzle corresponding to the raster line RL2 and positioned in the head position P1 and a nozzle corresponding to the raster line RL2 and positioned in the head position P2.

An overlap area SAk is positioned between a non-overlap area NAk and a non-overlap area NA(k+1). A length Ha in the conveyance direction of the overlap area SA is, for example, a length corresponding to about a few raster lines RL to a length corresponding to about several dozen of raster lines RL.

The reason why the overlap areas SA are provided is explained below. Assuming that a printing image is formed only by images printed in non-overlap areas without providing the overlap areas SA. In this case, so-called banding such as white streaks and black streaks may be caused at a boundary between two non-overlap areas adjacent to each other in the conveyance direction AR due to the variation in conveyance amount of the sheet M or the like. The banding decreases image quality of the printing image PI. Providing the overlap area SA between the two non-overlap areas NA and printing the image in the overlap area SA can inhibit the failure or trouble called the banding as described above. In the overlap area SA, the dots on one raster line RL are formed by executing the partial printing twice, and thus it is possible to inhibit all the dots on one raster line RL from being shifted from all the dots on any other raster line.

Figure 5A:
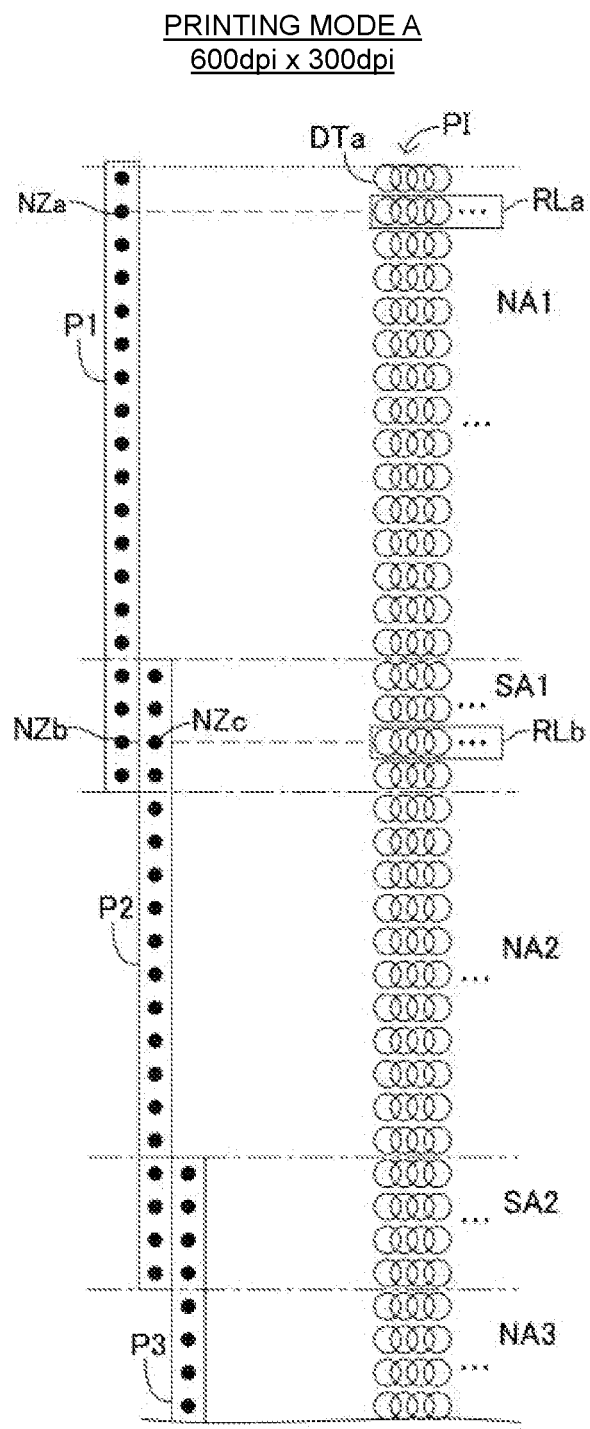
FIGS. 5A and 5B each illustrate a printing mode A according to the first embodiment.

FIG. 5A depicts head positions P1 to P3 for the first partial printing SP to the third partial printing SP in the printing mode A, and dots DTa forming the printing image PI printed by the printing mode A. Although dots of four colors (CMYK) are actually formed in one raster line RL, the dots DTa of one color are depicted in FIG. 5A. The same is applied to FIGS. 6A, 6B and FIG. 11 described below. The partial printing SP in the head positions P1 to P3 of FIG. 5A is executed by using all the nozzles.

In the printing mode A, the interlaced printing is not executed. Thus, in the printing mode A, the non-overlap areas NA of the printing image PI (e.g., NA1 and NA2 of FIG. 5A) are printed by executing the partial printing SP once. For example, all the raster lines in the non-overlap area NA1 of FIG. 5A are printed by the partial printing SP in the head position P1. For example, dots on a rater line RLa are formed by a nozzle NZa corresponding thereto and positioned in the head position P1.

In the printing mode A, the overlap areas SA of the printing image PI (e.g., SA1 and SA2 in FIG. 5A) are printed by executing the partial printing SP twice. For example, each of the raster lines RL in the overlap area SA1 of FIG. 5A is printed by the partial printing SP executed in the head position P1 and the partial printing SP executed in the head position P2. For example, the dots on a raster line RLb are formed by a nozzle NZb corresponding thereto and positioned in the head position P1 and a nozzle NZc corresponding thereto and positioned in the head position P2.

Figure 5B:
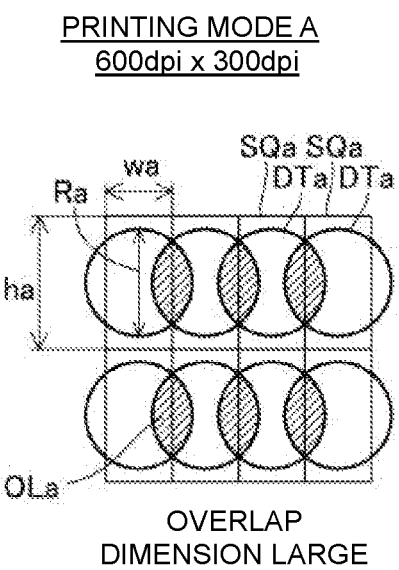

FIG. 5B is an enlarged view of the dots DTa forming the printing image PI printed by the printing mode A. The dots DTa are dots included in dots formed by the printing mode A and having a maximum diameter. In this embodiment, three types of dots (small dots, medium dots, large dots) are used for the printing of the printing image PI in order starting with the smallest diameter. The dots DTa are thus the large dots.

FIG. 5B depicts virtual rectangular areas SQa corresponding to the dots DTa. The center of each of the rectangular areas SQa is coincident with the center of the corresponding one of the dots DTa. A length in the main-scan direction (X direction) of the rectangular area SQa is equal to a dot interval wa in the main-scan direction between the dots DTa formed by the printing mode A. The dot interval wa in the main-scan direction is an interval based on resolution in the main-scan direction of the printing image PI. In this embodiment, the resolution in the main-scan direction of the printing mode A is 600 dpi (dot per inch). Thus, the dot interval wa in the main-scan direction is (1/600) inches. A length in the conveyance direction AR (sub-scan direction, Y direction) of the rectangular area SQa is equal to a dot interval ha in the conveyance direction AR between the dots DTa formed by the printing mode A. The dot interval ha in the conveyance direction AR is an interval based on resolution in the conveyance direction AR of the printing image PI. In this embodiment, the resolution in the conveyance direction AR of the printing mode A is 300 dpi (dot per inch). Thus, the dot interval ha in the conveyance direction AR is (1/300) inches. In the printing mode A, the dot interval ha in the conveyance direction AR is twice the dot interval wa in the main-scan direction.

The size of the dot DTa is set to a size suitable for a dimension of the rectangular area SQa so that an appropriate maximum density can be expressed when dots are formed most densely. The size of the dot DTa is set to a desired size by adjusting an amount of ink discharged from the nozzle at the time of forming the dot DTa. Since the dot interval wa is half of the dot interval ha in the printing mode A, a diameter Ra of the dot DTa is greatly larger than the dot interval wa in the main-scan direction. Thus, a dimension of an overlap portion OLa where two dots DTa adjacent to each other in the main-scan direction overlap with each other is greatly larger than that in the printing mode B described below. The diameter of the dot DTa is smaller than a dot interval ha in the conveyance direction AR. Thus, the two dots DTa adjacent to each other in the conveyance direction AR hardly overlap with each other.

Here, the smaller of the dot interval in the main-scan direction and the dot interval in the conveyance direction AR is defined as a minimum dot interval. In the printing mode A, the minimum dot interval is the dot interval wa in the main-scan direction. A ratio of the diameter of the maximum dot to the minimum dot interval is defined as a relative dot diameter Rre. A relative dot diameter RreA in the printing mode A is the diameter Ra of the dot DTa relative to the dot interval wa (RreA=(Ra/wa)).

A ratio of the dot interval in the conveyance direction AR to the dot interval in the main-scan direction is defined as an interval ratio SR. The interval ratio SRa in the printing mode A is (ha/wa)=2.

FIG. 6A depicts head positions P1 to P6 for the first partial printing SP to the sixth partial printing SP in the printing mode B, and dots DTb forming the printing image PI printed by the printing mode B. From among the nozzles in the respective head positions depicted in FIG. 6A, the nozzles depicted by black circles indicate nozzles used for the partial printing SP in the respective head positions, and the nozzles depicted by white circles indicate nozzles not used for the partial printing SP in the respective head positions. The same is applied to FIG. 11 described below.

In the printing mode B, the interlaced printing is executed. Thus, in the printing mode B, the non-overlap areas NA of the printing image PI (e.g., NA1 and NA2 of FIG. 6A) are printed by executing the partial printing SP twice. For example, two raster lines RLe and RLf are arranged in the conveyance direction AR in the non-overlap area NA1 of FIG. 6A by executing the partial printing SP twice. That is, the raster line RLe is printed by executing the partial printing SP once, and the raster line RLf is printed by executing the partial printing SP once. For example, the raster line RLe is printed by the partial printing SP in the head position P1, and the raster line RLf is printed by the partial printing SP in the head position P2. For example, dots on the raster line RLe are formed by a nozzle NZe corresponding thereto and positioned in the head position P1, and dots on the raster line RLf are formed by a nozzle NZf corresponding thereto and positioned in the head position P2.

In the printing mode B, the overlap areas SA of the printing image PI (e.g., SA1 and SA2 of FIG. 6A) are printed by executing the partial printing SP four times. For example, two raster lines RLg and RLi are arranged in the conveyance direction AR in the overlap area SA1 of FIG. 6A by executing the partial printing SP four times. That is, the raster line RLg is printed by executing the partial printing SP twice, and the raster line RLi is printed by executing the partial printing SP twice. For example, the raster line RLg is printed by both the partial printing SP in the head position P2 and the partial printing SP in the head position P4. The raster line RLi is printed by both the partial printing SP in the head position P1 and the partial printing SP in the head position P3. For example, dots on the raster line RLg are formed by a nozzle NZg corresponding thereto and positioned in the head position P2 and a nozzle NZh corresponding thereto and positioned in the head position P4, and dots on the raster line RLi are formed by a nozzle NZi corresponding thereto and positioned in the head position P1 and a nozzle NZj corresponding thereto and positioned in the head position P3.

FIG. 6B is an enlarged view of dots DTb forming the printing image PI printed by the printing mode B. The dot DTb is the large dot having the maximum diameter from among the dots used for the printing mode B.

FIG. 6B depicts virtual rectangular areas SQb corresponding to the dots DTb. The center of each of the rectangular areas SQb is coincident with the center of the corresponding one of the dots DTb. A length in the main-scan direction (X direction) of the rectangular area SQb is equal to a dot interval wb in the main-scan direction between the dots DTb formed by the printing mode B. A length in the conveyance direction AR (sub-scan direction, Y direction) of the rectangular area SQb is equal to a dot interval hb in the conveyance direction AR between the dots DTb formed by the printing mode B. In this embodiment, the resolution in the main-scan direction and the resolution in the conveyance direction AR of the printing mode B are 600 dpi. Thus, the dot interval wb and the dot interval hb are (1/600) inches. In the printing mode B, the dot interval hb in the conveyance direction AR is equal to the dot interval wb in the main-scan direction. That is, the dot interval ha in the conveyance direction AR of the printing mode A is larger than the dot interval hb in the conveyance direction AR of the printing mode B.

Similar to the dots DTa described above, the size of the dot DTb is set to a size suitable for a dimension of the rectangular area SQb so that an appropriate maximum density can be expressed when dots are formed most densely. In the printing mode B, since the dot interval wb is equal to the dot interval hb, the diameter of the dot DTb is approximately the same as the dot interval wb in the main-scan direction and the dot interval hb in the conveyance direction AR. Thus, a dimension of an overlap portion OLb where two dots DTb adjacent to each other in the main-scan direction and the conveyance direction AR overlap with each other is greatly smaller than the dimension of the overlap portion OLa in the printing mode A.

In the printing mode B, the minimum dot interval is the dot interval wb in the main-scan direction and the dot interval hb in the conveyance direction AR. Thus, a relative dot diameter RreB of the printing mode B is a diameter Rb of the dot DTb relative to the dot interval wb (RreB=(Rb/wb)). It can be said that the relative dot diameter Rre is an index value related to a dot overlap dimension per unit dimension (also referred to as a unit overlap dimension). The unit overlap dimension is larger, as the relative dot diameter Rre is larger. In this embodiment, the relative dot diameter RreA of the printing mode A is larger than the relative dot diameter RreB of the printing mode B. The unit overlap dimension of the printing mode A is larger than the unit overlap dimension of the printing mode B.

In the printing mode B, since the dot interval wb in the main-scan direction is equal to the dot interval hb in the conveyance direction AR, an interval ratio SRb in the printing mode B is 1. The density expressed when the dots are formed most densely is determined by a ratio of a dimension of one large dot to a dimension of the rectangular area (e.g., SQa, SQb). Thus, when the same level of density is expressed, the relative dot diameter Rre and the unit overlap dimension are smaller, as the interval ratio SR is closer to 1. In this embodiment, the interval ratio SRb of the printing mode B is closer to 1 than the interval ratio SRa of the printing mode A. The unit overlap dimension of the printing mode B is smaller than the unit overlap dimension of the printing mode A.

In this embodiment, printing is executed by a mode designated by a user's instruction input at the time of starting the printing process from among the printing mode A and the printing mode B.

<Printing Data Output Process>

Figure 3:
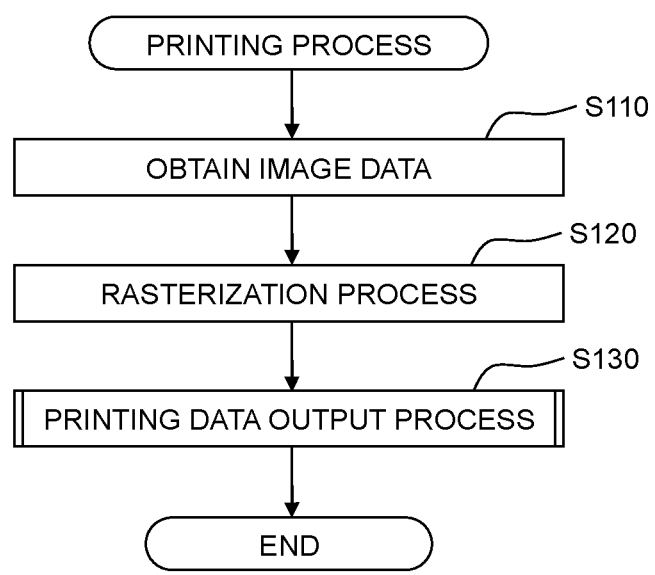
FIG. 3 is a flowchart of a printing process.

Subsequently, the printing data output process in S130 of FIG. 3 is explained. As described above, in the printing data output process, the pieces of partial printing data are generated per partial printing SP by using the RGB image data, various kinds of control data are added to the pieces of partial printing data, and then the pieces of partial printing data are output to the printing mechanism 100.

The RGB image RI indicated by the RGB image data to be subjected to a color conversion process corresponds to the printing image PI of FIG. 4. It can thus be said that FIG. 4 depicts the RGB image RI. The RGB image RI includes raster lines RL (e.g., RL1 of FIG. 4) extending in the X direction in FIG. 4 (direction corresponding to the main-scan direction at the time of printing) and having different positions in the Y direction. Each raster line RL, which extends in the X direction in FIG. 4, is formed by pixels. As described above, each raster line RL of the printing image PI in which dots are formed corresponds one-to-one to each raster line RL of the RGB image RI formed by pixels. Thus, in the present specification and the drawings, the raster lines of the printing image PI and the raster lines of the RGB image RI are designated by the same reference numerals. In the RGB image RI, respective areas corresponding to the overlap areas SA and the non-overlap areas NA of the printing image PI are referred to as overlap areas SA and non-overlap areas NA of the RGB image RI. In the RGB image RI, a direction that corresponds to the conveyance direction AR of the printing image PI is referred to as a conveyance direction AR of the RGB image RI.

Figure 7:
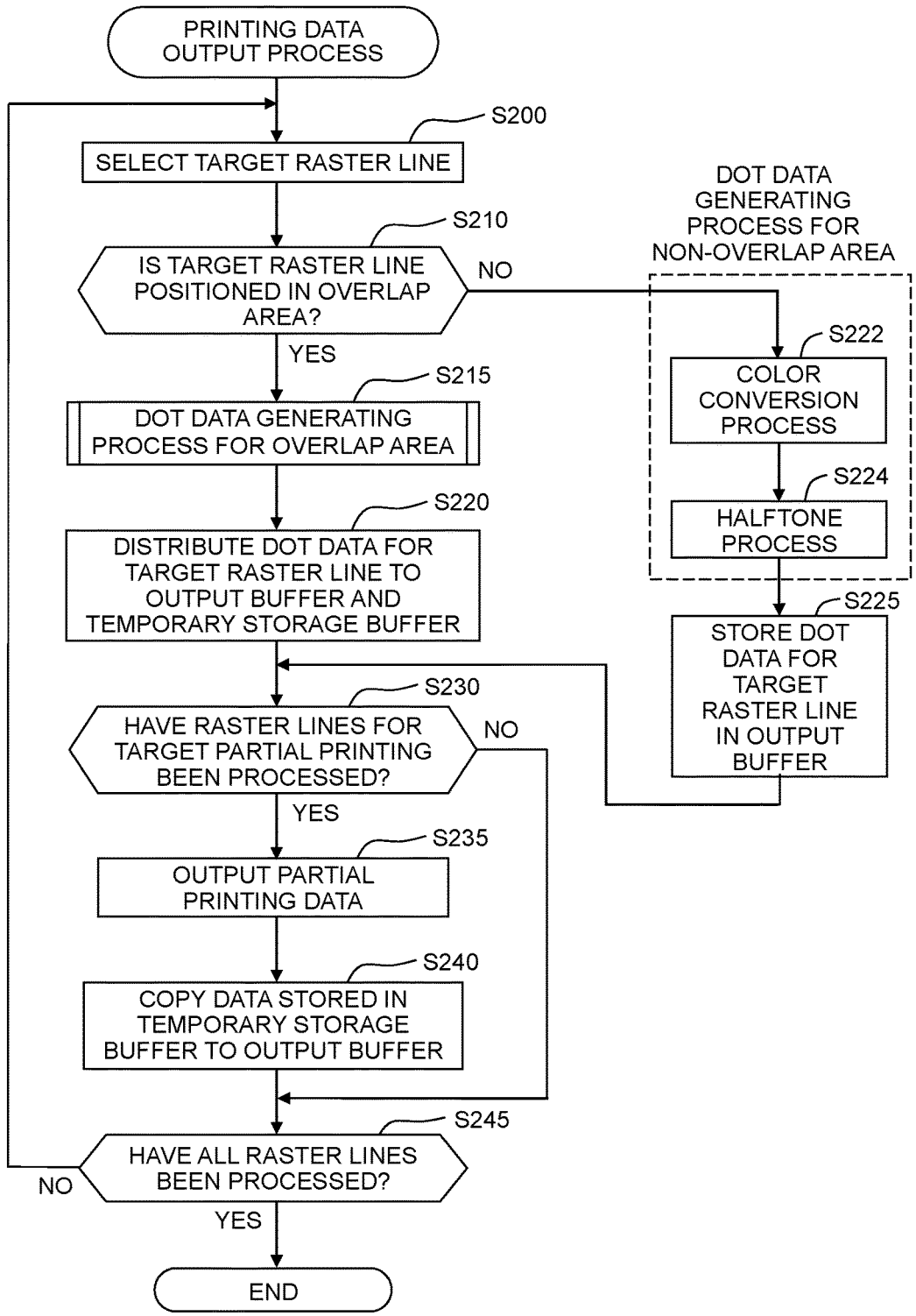
FIG. 7 is a flowchart indicating a printing data output process.

As depicted in FIG. 7, in S200 of the printing data output process, the CPU 210 selects, for example, a target raster line from among the raster lines RL of the RGB image RI sequentially from the downstream side in the conveyance direction AR (+Y side in FIG. 4) at the time of printing. For example, the first target raster line is the raster line RL1 of FIG. 4.

Here, the partial printing SP for printing the target raster line is also referred to as target partial printing. However, when the target raster line is printed by executing the partial printing SP twice, that is, when the target raster line is positioned in the overlap area SA, partial printing executed first that is included in the partial printing executed twice is defined as the target partial printing. For example, when the raster lines RLa and RLb of FIG. 5A are the target raster lines, the target partial printing is the partial printing SP executed in the head position P1 in FIG. 5A. When the raster lines RLe and RLi of FIG. 6A are the target raster lines, the target partial printing is the partial printing SP executed in the head position P1 in FIG. 6A. When the raster lines RLf and RLg of FIG. 6A are the target raster lines, the target partial printing is the partial printing SP executed in the head position P2 in FIG. 6A.

In S210, the CPU 210 determines whether the target raster line is positioned in the overlap area SA. For example, when the raster line RLb of FIG. 5A and the raster lines RLg and RLi of FIG. 6A are the target raster lines, the CPU 210 determines that the target raster lines are positioned in the overlap areas SA.

When the target raster line is not positioned in the overlap area SA (S210: NO), that is, when the target raster line is positioned in the non-overlap area NA, the CPU 210 executes a dot data generating process for the non-overlap area in S222 and S224.

In S222, the CPU 210 executes the color conversion process on the pieces of data included in the RGB image data and corresponding to the target raster line. In the color conversion process, RGB values of the pixels forming the target raster line are converted into CMYK values. The CMYK values are color values of a CMYK color system including component values (component values of C, M, Y, and K in this embodiment) corresponding to inks used for printing. The color conversion process is executed while referring to, for example, a publicly-known look up table that defines a correspondence relationship between the RGB values and the CMYK values.

In S224, the CPU 210 executes a halftone process on the pieces of data corresponding to the target raster line for which the color conversation process has been executed. This generates pieces of dot data of C, M, Y, and K for the target raster line in the non-overlap area NA. The pieces of dot data indicate dot formation states of the color components of CMYK for each pixel. For example, dot data for each pixel indicates dot formation states having four gradations of "no dot", "small", "medium", and "large". Alternatively, dot data for each pixel may indicate dot formation states having two gradations of "no dot" and "with dot". The halftone process is executed by a publicly-known method, such as a dither method or an error diffusion method.

When the target raster line is not positioned in the overlap area SA, all the dots corresponding to the pixels included in the target raster line should be formed by the target partial printing. Thus, in S225, the CPU 210 stores the pieces of dot data for the target raster line that have already been generated, in an output buffer. In the printing mode A, a buffer for the partial printing executed once is reserved as the output buffer. In the printing mode B, buffers for the partial printing executed twice are reserved as the output buffers in order to execute the interlaced printing. In the printing mode B, the pieces of dot data for the target raster line are stored in a buffer that is included in the buffers for the partial printing executed twice and that corresponds to the partial printing for printing the target raster line.

When the target raster line is positioned in the overlap area SA (S210: YES), the CPU 210 executes the dot data generating process for the overlap area indicated in FIG. 8 (S215).

Figure 8:
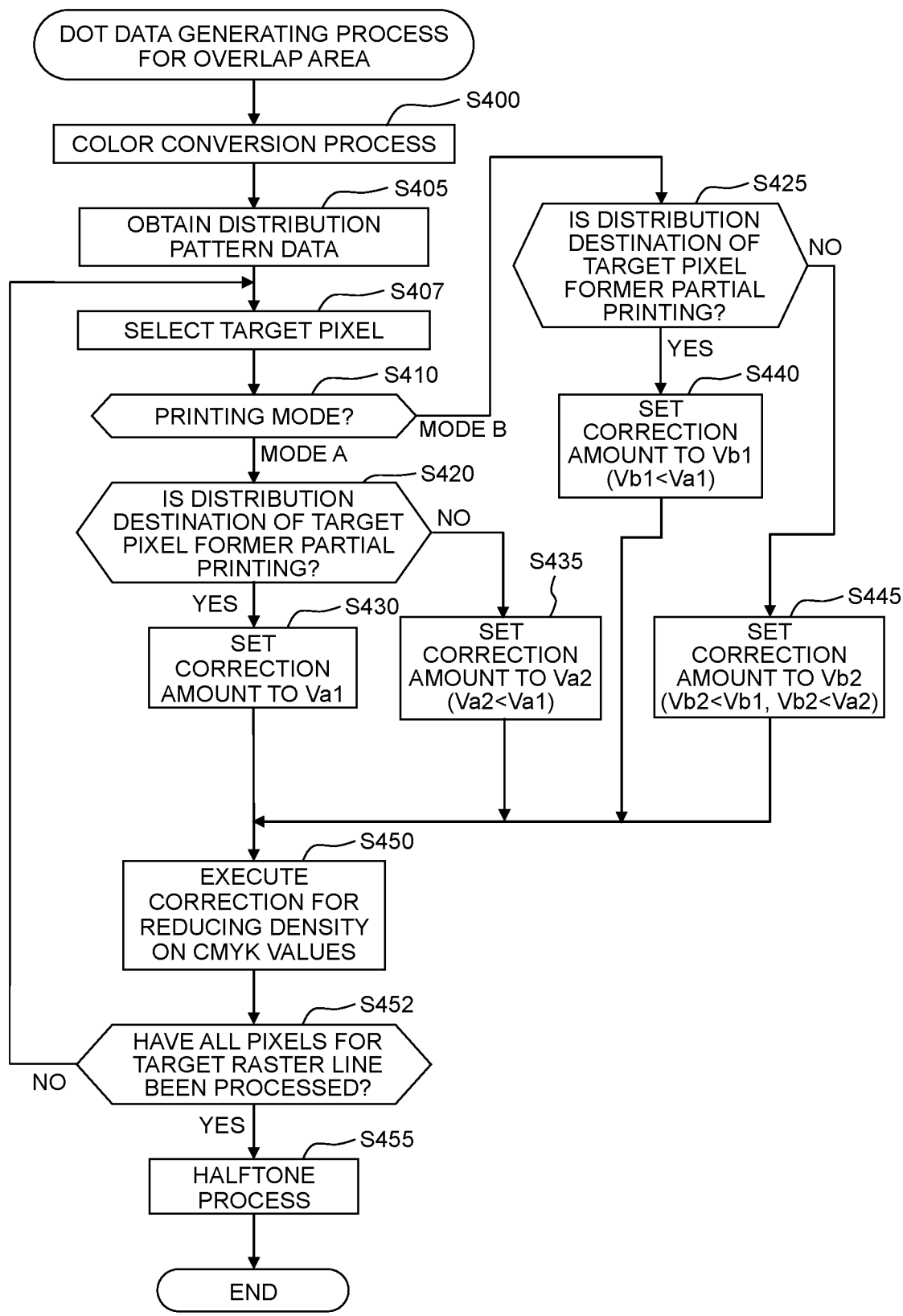
FIG. 8 is a flowchart of a dot data generating process for an overlap area according to the first embodiment.

In S400 of FIG. 8, the CPU 210 executes the color conversion process on the pieces of data included in the RGB image data and corresponding to the target raster line. This converts the values of the pixels forming the target raster line from the RGB values into the CMYK values.

Figure 9A:
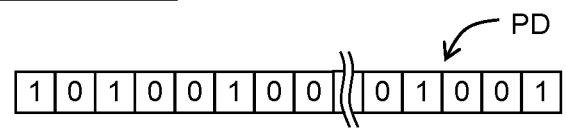
FIG. 9A depicts a distribution pattern data.

In S405, the CPU 210 obtains distribution pattern data PD corresponding to the target raster line. As depicted in FIG. 9A, the distribution pattern data PD is binary data having a value that corresponds to each pixel of the target raster line. A value "0" of the distribution pattern data PD indicates that dots corresponding to the pixel are formed by the target partial printing. A value "1" of the distribution pattern data PD indicates that dots corresponding to the pixel are formed by partial printing executed after the target partial printing.

Figure 9B:
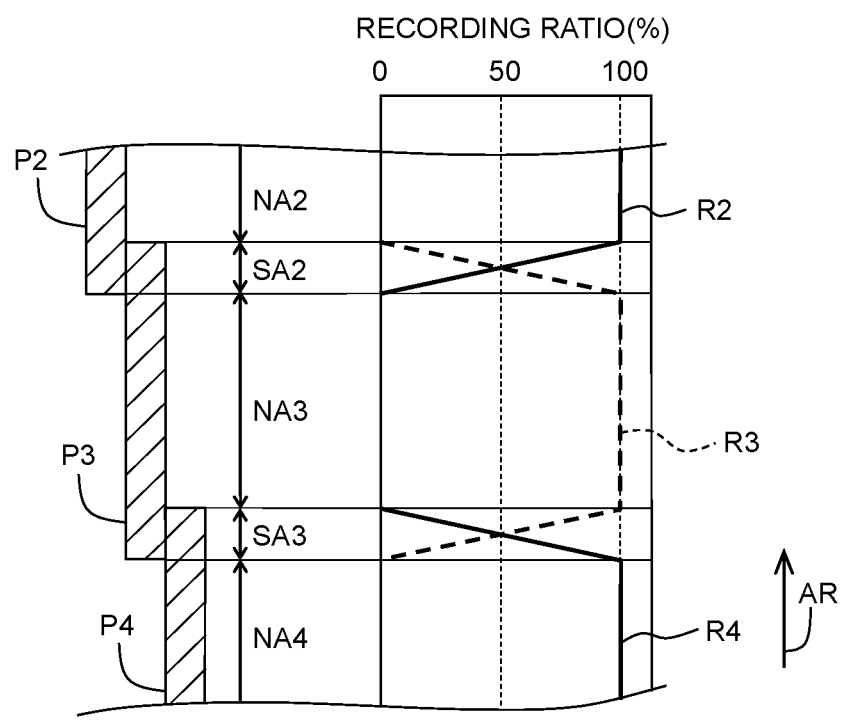
FIG. 9B depicts recording ratios of non-overlap areas and overlap areas.

FIG. 9B depicts recording ratios R2, R3, and R4 in the printing mode A as an example. The recoding ratios R2, R3, and R4 are recording ratios in the partial printing SP in the head positions P2, P3, and P4. FIG. 9B depicts each of the recoding ratios R2, R3, and R4 with respect to the position in the conveyance direction AR. In a range in the conveyance direction AR corresponding to the non-overlap area NA2 (FIG. 4), the recording ratio R2 is 100%. Similarly, in ranges in the conveyance direction AR corresponding to the non-overlap areas NA3 and NA4 (FIG. 4), the recording ratios R3 and R4 are 100%.

In a range in the conveyance direction AR corresponding to the overlap area SA2 (FIG. 4), the recording ratio R2 linearly decreases toward the upstream side in the conveyance direction AR (lower side in FIG. 9B). In the range in the conveyance direction AR corresponding to the overlap area SA2, the recording ratio R3 linearly decreases toward the downstream side in the conveyance direction AR (upper side in FIG. 9B). In the range in the conveyance direction AR corresponding to the overlap area SA2 (FIG. 4), the sum of the recording ratio R2 and the recording ratio R3 is 100%. The same is applied to the recording ratios R3 and R4 in a range in the conveyance direction AR corresponding to the overlap area SA3 (FIG. 4).

Although FIG. 9B depicts the recording ratios only for the partial printing in the head positions P2 to P4, the partial printing in the head positions P1 and P5 also has similar recording ratios. Thus, printing can be executed at a recording ratio of 100% in the non-overlap areas NA1 to NA5 and the overlap areas SA1 to SA4.

The distribution pattern data PD is generated to achieve the above recording ratios depending on the positions in the conveyance direction AR in the overlap areas SA.

The CPU 210 refers to the distribution pattern data PD corresponding to the target raster line, and determines whether a distribution destination of each pixel forming the target raster line is former partial printing (current target partial printing) or latter partial printing that are included in the partial printing executed twice for printing the target raster line.

In S407 of FIG. 8, the CPU 210 selects one target pixel from among the pixels forming the target raster line. In S410, the CPU 210 determines which of the printing modes A and B is to be executed.

When the CPU 210 determines to execute the printing mode A, the CPU 210 refers to the distribution pattern data PD and determines whether the distribution destination of the target pixel is the former partial printing (current target partial printing) (S420). When the distribution destination of the target pixel is the former partial printing (S420: YES), the CPU 210 sets a correction amount of the target pixel to Va1 (S430). When the distribution destination of the target pixel is the latter partial printing (S420: NO), the CPU 210 sets the correction amount of the target pixel to a Va2 smaller than the Va1 (S435).

When the CPU 210 determines to execute the printing mode B, the CPU 210 refers to the distribution pattern data PD, and determines whether the distribution destination of the target pixel is the former partial printing (S425). When the distribution destination of the target pixel is the former partial printing (S425: YES), the CPU 210 sets the correction amount of the target pixel to Vb1 smaller than Va1 (S440). When the distribution destination of the target pixel is the latter partial printing (S425: NO), the CPU 210 sets the correction amount of the target pixel to Vb2 smaller than Vb1 and Va2 (S445). The correction amounts Va1, Va2, Vb1, and Vb2 are, for example, values greater than 0 and less than 1. The correction amounts Va1, Va2, Vb1, and Vb2 are, for example, values each indicating a ratio at which a density value is reduced. The degree of reduction in density of the image is larger, as the correction amount is larger.

In S450, the CPU 210 uses the correction amount V determined in S430 to S445 (any of the Va1, Va2, Vb1, and Vb2) to execute, on the CMYK values of the target pixel, the correction for reducing the density. That is, the CPU 210 corrects a value of a component corresponding to a specific ink from among the color values of each pixel included in the RGB image data. Specifically, values obtained by multiplying the component values of C, M, Y, and K by a coefficient (1−V) based on the correction amount V are determined as component values after correction.

In S452, the CPU 210 determines whether all the pixels forming the target raster line have been processed. When there is a pixel that has not yet been processed (S452: NO), the PCU 210 returns to S407. When all the pixels have been processed (S452: YES), the CPU 210 executes the halftone process on the CMYK values after correction of the pixels forming the target raster line (S455), and then ends the dot data generating process for the overlap area. Accordingly, the pieces of dot data of C, M, Y, and K for the target raster line in the overlap area SA are generated.

In S220 of FIG. 7, the CPU 210 distributes the pieces of dot data for the target raster line to the output buffer and a temporary storage buffer in accordance with the distribution pattern data PD, and stores them therein. That is, the data that is included in the pieces of dot data for the target raster line and that indicates the dot to be formed by the former partial printing (current target partial printing) is stored in the output buffer. The data that is included in the pieces of dot data for the target raster line and that indicates the dot to be formed by the latter partial printing is stored in the temporary storage buffer.

In S230, the CPU 210 determines whether all the raster lines to be formed by the target partial printing have been processed as the target raster lines. For example, when the raster line RL2 that is included in the raster lines RL corresponding to the head position P1 of FIG. 4 and that is positioned most upstream in the conveyance direction AR is the target raster line, the CPU 210 determines that all the raster lines to be formed by the target partial printing have been processed.

When all the raster lines to be formed by the target partial printing have been processed (S230: YES), the pieces of dot data for the target partial printing have been already stored in the output buffer at this time. Thus, in this case, the CPU 210 outputs the pieces of dot data for the target partial printing as the pieces of partial printing data to the printing mechanism 100 (S235). Before the pieces of partial printing data are output, control data that indicates a conveyance amount of the sheet conveyance T to be executed after the target partial printing, is added to each piece of partial printing data. For example, assuming that the target partial printing is the partial printing SP in the head position P1 of FIG. 4. In this case, the conveyance amount of the sheet conveyance T to be executed after the target partial printing is a value (D−Ha) obtained by subtracting Ha from the nozzle length D.

In S240, the CPU 210 deletes, from the output buffer, the pieces of partial printing data that have been already output, and copies the pieces of data stored in the temporary storage buffer to the output buffer. For example, at the time at which the last raster line RL2 corresponding to the head position P1 in FIG. 4 has been processed, the raster lines that are included in the raster lines corresponding to the head position P2 and positioned in the overlap area SA1 have already been processed. Further, pieces of data that are included in the pieces of dot data corresponding to the processed raster lines and that are used for the partial printing SP2 executed in the head position P2 have already been stored in the temporary storage buffer. In S240, those pieces of data are copied to the output buffer.

When there is a raster line that has not yet been processed for the target partial printing (S230: NO), the CPU 210 skips S235 and S240.

In S245, the CPU 210 determines whether all the raster lines in the RGB image RI have been processed as the target raster lines. When there is a raster line that has not yet been processed (S245: NO), the CPU 210 returns to S200 and selects the raster line that has not yet been processed as the target raster line. When all the raster lines have been processed (S245: YES), the CPU 210 ends the printing data output process.

According to the first embodiment described above, the CPU 210 obtains the RGB image data as the object image data (S110 in FIG. 3), and generates the pieces of dot data using the RGB image data (S222, S224, S215 in FIG. 7). The CPU 210 causes the printing mechanism 100 to execute ink discharge and conveyance of the sheet M by using the piece of dot data, thus printing the printing image PI (S235 in FIG. 7). As explained above with reference to FIG. 4, dots having a specified color (e.g., dots C) forming each raster line RL included in the non-overlap area NA of the printing image PI are formed by one nozzle corresponding to said each raster line RL. Dots having a specified color forming each raster line RL included in the overlap area SA of the printing image PI are formed by two or more nozzles corresponding to said each raster line RL.

The CPU 210 executes the dot data generating process for the non-overlap area (S222, S224 in FIG. 7) on the pieces of partial image data included in the RGB image data and corresponding to the non-overlap area NA, thus generating the pieces of dot data included in the pieces of dot data for the printing image PI and corresponding to the non-overlap area NA. The CPU 210 executes the dot data generating process for the overlap area (S215 of FIG. 7, FIG. 8) on the pieces of partial image data included in the RGB image data and corresponding to the overlap area SA, thus generating the pieces of dot data included in the pieces of dot data for the printing image PI and corresponding to the overlap area SA. In the dot data generating process for the overlap area, the correction for reducing the density (S450 of FIG. 7) is executed. It can thus be said that the dot data generating process for the overlap area is a process for generating the pieces of dot data that correspond to the overlap area SA so that the image in the overlap area SA is printed at a density equal to or less than a density of a case where the dot data generating process for the non-overlap area is executed on the pieces of partial image data corresponding to the overlap area SA.

In this embodiment, the degree of reduction in density of the image in the overlap area SA in the dot data generating process for the overlap area (S420, S430, S435, and the like of FIG. 8) executed when printing is executed by the printing mode A in which the relative dot diameter Rre is large, is larger than that in the dot data generating process for the overlap area (S425, S440, S445, and the like of FIG. 8) executed when printing is executed by the printing mode B in which the relative dot diameter Rre is small. For example, the correction amounts Va1 and Va2 (S430, S435 of FIG. 8) of the density of the overlap area SA set in the printing mode A are larger than the correction amounts Vb1 and Vb2 (S440, S445 of FIG. 8) of the density of the overlap area SA set in the printing mode B (Vb1<Va1, Vb2<Va2). The printer 200 thus prints the image in the overlap area SA at an appropriate density depending on the printing mode.

Explanation is made more specifically. In the overlap area SA in which dots having a specified color (e.g., dots C) on one raster line RL are formed by two or more nozzles, there is a time lag after the dot is formed by one nozzle before the dot is formed by another nozzle. That is, the dot formed by the one nozzle spreads over the sheet M, and then the dot is formed by another nozzle so that the dot formed by another nozzle overlaps with the dot formed by the one nozzle. A total dimension of dots in the overlap area SA is thus likely to be larger than a total dimension of dots in the non-overlap area NA. Even when an image is printed by using the same image data, the density of the image printed in the overlap area SA is likely to be higher than the density of the image printed in the non-overlap area NA. This may cause color unevenness (color irregularity) between the overlap area SA and the non-overlap area NA in the printing image PI. In order to inhibit the color unevenness, the correction for reducing the density of the overlap area SA is executed in this embodiment.

The printing mode having a larger dot overlap dimension per unit dimension (unit overlap dimension) results in higher density of the overlap area SA. The reason thereof is that variation in the total dimension of dots due to the time lag is caused when dots overlap with each other, and the variation is not likely to be caused when no dots overlap with each other. As described above, the unit overlap dimension is larger in the printing mode of which relative dot diameter Rre is larger. Thus, the degree in reduction of density of the overlap area SA is preferably larger in the printing mode of which relative dot diameter Rre is larger. In this embodiment, the relative dot diameter Rre of the printing mode A is larger than that of the printing mode B, and the degree in reduction of density of the overlap area SA in the printing mode A is larger than that in the printing mode B. It is thus possible to print the image of the overlap area SA at an appropriate density depending on the printing mode. The printer 200 can thus efficiently inhibit color unevenness between the overlap area SA and the non-overlap area NA depending on the printing mode.

In view of the interval ratio SR between the dot interval in the main-scan direction and the dot interval in the conveyance direction AR, the unit overlap dimension is smaller in the printing mode of which interval ratio SR is closer to 1. Thus, it is preferable that the degree in reduction of density of the overlap area SA is larger in the printing mode of which interval ratio SR is further away from 1. In this embodiment, the interval ratio SR of the printing mode A is further away from 1 than the interval ratio SR of the printing mode B. Further, the degree in reduction of density of the overlap area SA in the printing mode A is larger than that in the printing mode B. It is thus possible to print the image of the overlap area SA at an appropriate density depending on the printing mode. The printer 200 thus inhibits color unevenness efficiently depending on the printing mode which may otherwise by caused between the overlap area SA and the non-overlap area NA.

The printer 200 of this embodiment is a serial printer in which the printing image PI is printed by causing the printing mechanism 100 to execute the conveyance (sub-scan) of the sheet M and the partial printing SP a plurality of times. In the partial printing SP, ink is discharged from the printing head 110 during the main-scan. The serial printer easily has color evenness between the overlap area SA and the non-overlap area NA when dots forming the raster line are formed by using two nozzles. This is because the time lag in the serial printer is larger than the time lag in a line printer described below. In this embodiment, it is possible to efficiently inhibit the color unevenness in the serial printer that is likely to cause the color unevenness.

In this embodiment, the printing mode B is the interlaced mode (FIG. 6) in which the two raster lines included in the raster lines of the non-overlap area NA are printed continuously in the conveyance direction AR by executing the partial printing twice, and each of the two raster lines is printed by executing corresponding partial printing once. The printing mode A is the non-interlaced mode (FIG. 5) in which the raster lines of the non-overlap area NA are printed by executing the partial printing once. As described above, in this embodiment, the printing mode B adopts the interlaced mode, and the resolution in the conveyance direction AR in the printing mode B is higher than that in the printing mode A. This makes the relative dot diameter RreB of the printing mode B smaller than the relative dot diameter RreA of the printing mode A, and the interval ratio SRb of the printing mode B is closer to 1 than the interval ratio SRa of the printing mode A. Thus, the printing mode A is different from the printing mode B in the likelihood of color unevenness between the overlap area SA and the non-overlap area NA. In this embodiment, it is possible to efficiently inhibit the color unevenness between the overlap area SA and the non-overlap area NA depending on the number of times of the partial printing when the raster lines are printed continuously in the conveyance direction AR, that is, the presence or absence of the interlaced printing and/or the number of passes in the interlaced printing.

In this embodiment, the dot interval ha in the conveyance direction AR of the printing mode A is larger than the dot interval hb in the conveyance direction AR of the printing mode B (FIG. 5B, FIG. 6B). This makes the relative dot diameter RreB of the printing mode B smaller than the relative dot diameter RreA of the printing mode A, and the interval ratio SRb of the printing mode B is closer to 1 than the interval ratio SRa of the printing mode A. The printing mode A is thus different from the printing mode B in the likelihood of color unevenness between the overlap area SA and the non-overlap area NA. In this embodiment, it is possible to efficiently inhibit the color evenness between the overlap area SA and the non-overlap area NA depending on the dot interval in the conveyance direction AR.

In this embodiment, the CPU 210 generates the pieces of dot data (S455 of FIG. 8) by obtaining pieces of CMYK image data that include the color values of the CMYK color system for each pixel (S400 of FIG. 8), executing the correction process (S450 of FIG. 8) on the pieces of CMYK image data, and executing the halftone process on the pieces of CMYK image data after correction. The pieces of CMYK image data indicate the densities of C, M, Y, and K to be printed. It is thus possible to appropriately correct the density of the image of the overlap area SA to be printed by executing the correction process on the pieces of CMYK image data.

In this embodiment, the density of the image of the overlap area SA is reduced (S420 to S445 of FIG. 8) so that the degree (e.g., correction amounts Va1, Vb1) of reduction in density of the pixel corresponding to the dot that is included in the dots forming the raster lines of the overlap area SA and that is formed first is larger than the degree (e.g., correction amounts Va2, Vb2) of reduction in density of the pixel corresponding to the dot that is included in the dots forming the raster lines of the overlap area SA and that is formed later (e.g., Va2<Va1, Vb2<Vb1). The reason why the density of the overlap area SA is likely to be high is that the dot formed first spreads over the sheet M, which makes the density of the dot formed first high. In this embodiment, the degree of reduction in density (e.g., correction amount) is determined appropriately by including the above, thus making it possible to reduce the density of the image of the overlap area SA appropriately.

As understood from the above explanation, the non-overlap area NA in the first embodiment is an exemplary first area. The overlap area SA is an exemplary second area. The partial image data included in the RGB image data and corresponding to the non-overlap area NA is exemplary first partial image data. The partial image data included in the RGB image data and corresponding to the overlap area SA is exemplary second partial image data. The dot data generating process for the non-overlap area in S222 and S224 of FIG. 7 is an exemplary first area process, and the dot data generating process for the overlap area of S215 in FIG. 7 and FIG. 8 is an exemplary second area process. The printing mode B is an exemplary first printing mode, and the printing mode A is an exemplary second printing mode.

Second Embodiment

Figure 10:
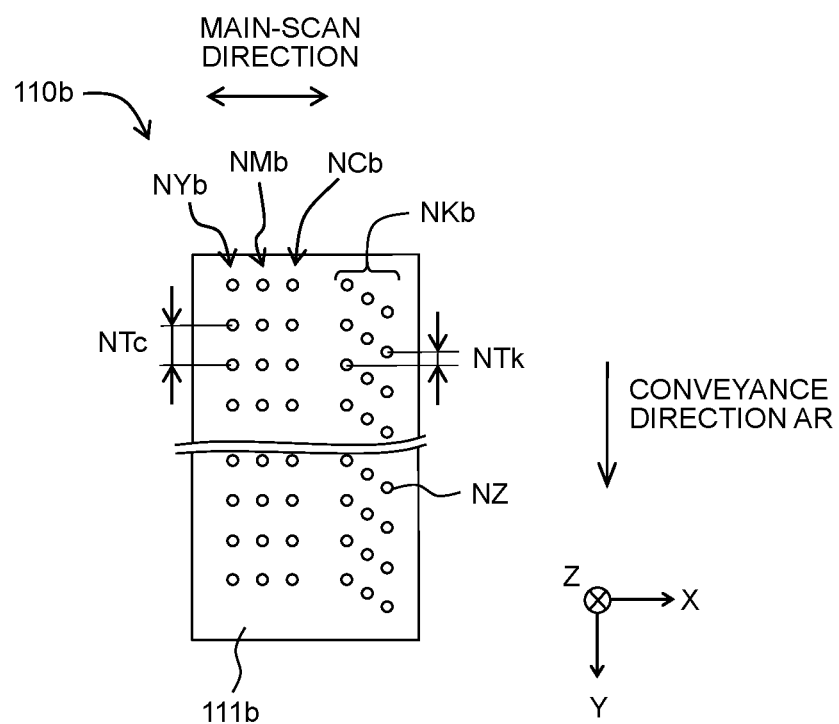
FIG. 10 depicts a configuration of a printing head according to a second embodiment.

The second embodiment is different from the first embodiment in the configuration of the printing head of the printer. FIG. 10 depicts a configuration of a printing head 110b according to the second embodiment when seen from the −Z side (lower side in FIG. 2). As depicted in FIG. 10, nozzle rows formed by nozzles, that is, nozzle rows NCb, NMb, NYb, and NKb from which respective inks of C, M, Y, and K are discharged are formed in a nozzle formation surface 111b of the printing head 110b. The nozzle rows include nozzles NZ arranged in the conveyance direction AR.

The nozzles NZ belonging to the respective nozzle rows have different positions in the conveyance orientation AR (+Y direction). The nozzles NZ are arranged in the conveyance direction AR at a predefined nozzle interval. A nozzle interval NTc in the nozzle rows NCb, NMb, and NYb for chromatic colors of C, M, and Y is, for example, an interval of about 200 dpi (i.e., (1/200) inches). A nozzle interval NTk in the nozzle row NKb for achromatic color of K is, for example, an interval of about 600 dpi (i.e., (1/600) inches). Thus, in the second embodiment, the nozzle interval NTc in the nozzle rows NCb, NMb, and NYb for the chromatic colors is three times as long as the nozzle interval NTk in the nozzle row NKb for the achromatic color K. For example, the nozzle row NKb includes three nozzle rows shifted from each other in the conveyance direction AR by the nozzle interval NTk, thus resulting in a short nozzle interval. In other words, the printing head 110 includes: the first nozzle from which the ink having the chromatic color is discharged; the second nozzle from which the ink having the chromatic color is discharged, the second nozzle being positioned at the downstream side in the conveyance direction AR of the first nozzle; the third nozzle from which the ink having the chromatic color is discharged, the third nozzle being positioned at the downstream side in the conveyance direction AR of the first and second nozzles; the fourth nozzle from which the ink having the chromatic color is discharged, the fourth nozzle being positioned at the downstream side in the conveyance direction AR of the first, second, and third nozzles; and fifth nozzles from which the ink having the achromatic color is discharged, the fifth nozzles being arranged in the conveyance direction AR. An interval in the conveyance direction AR between the first nozzle and the second nozzle is longer than an interval in the conveyance direction AR between the fifth nozzles. An interval in the conveyance direction AR between the second nozzle and the third nozzle is longer than an interval in the conveyance direction AR between the fifth nozzles. An interval in the conveyance direction AR between the third nozzle and the fourth nozzle is longer than an interval in the conveyance direction AR between the fifth nozzles. Thus, monochrome printing in which printing is executed only using the ink K can print an image with higher resolution at higher speed than color printing.

Figure 11:
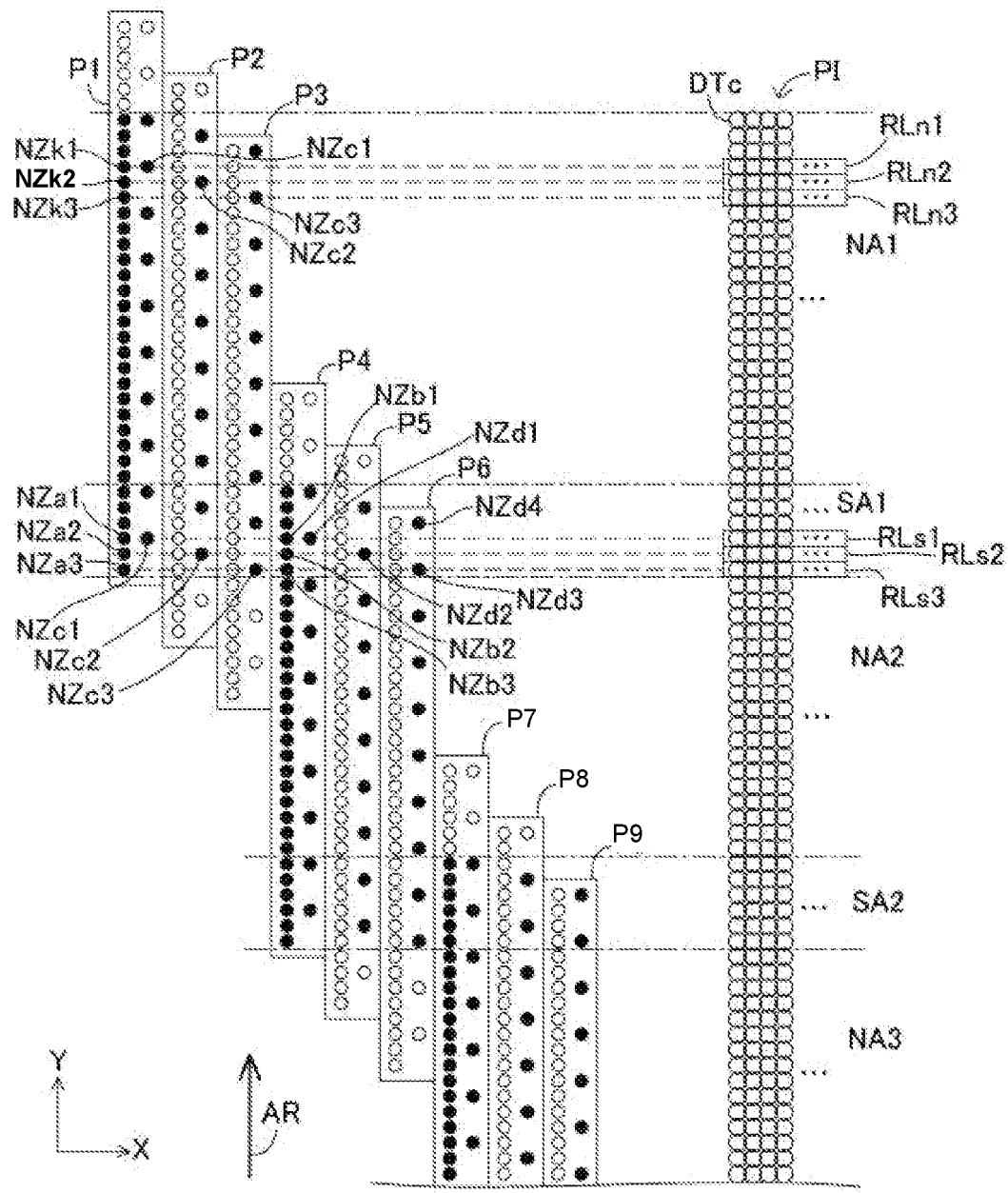
FIG. 11 illustrates a printing mode C according to the second embodiment.

Explanation is made about a printing mode C for color printing according to the second embodiment. FIG. 11 illustrates the printing mode C of the second embodiment. FIG. 11 depicts head positions P1 to P9 for the first partial printing SP to the ninth partial printing SP in the printing mode C and dots DTc forming the printing image PI printed by the printing mode C. Each rectangle indicating the head position in FIG. 11 includes two nozzle rows. T nozzles disposed at the left at a small interval are nozzles belonging to the nozzle row NKb (FIG. 10) for the achromatic color K. The nozzles disposed at the right at a large interval are nozzles belonging to any of the nozzle rows NCb, NMb, and NYb (FIG. 10) for the chromatic colors.

In the printing mode C, the printing mode forming the dots K is different from the printing mode forming the chromatic color dots (CMY). The printing mode forming the dots K is the non-interlaced mode similar to the printing mode A according to the first embodiment. Thus, in the printing mode forming the dots K, the non-overlap areas NA of the printing image PI (e.g., NA1 and NA2 in FIG. 11) are printed by executing the partial printing SP once. For example, in the printing mode forming the dots K, all the raster lines of the non-overlap area NA1 in FIG. 11 are printed by the partial printing SP in the head position P1. For example, the dots K on raster lines RLn1, RLn2, and RLn3 are respectively formed by using nozzles NZk1, NZk2, and NZk3 corresponding thereto in the head position P1.

In the printing mode forming the dots K, the overlap areas SA (e.g., SA1 and SA2 in FIG. 11) of the printing image PI are printed by executing the partial printing SP twice. For example, in the printing mode forming the dots K, the raster lines RL of the overlap area SA1 in FIG. 11 are printed by executing the partial printing SP in the head position P1 and the partial printing SP in the head position P4. For example, the dots K on raster lines RLs1, RLs2, and RLs3 are respectively formed by using nozzles NZa1, NZa2, and NZa3 corresponding thereto and positioned in the head position P1 and nozzles NZb1, NZb2, and NZb3 corresponding thereto and positioned in the head position P4.

In the printing mode for the chromatic colors, the interlaced printing is executed. Thus, in the printing mode for the chromatic colors, the non-overlap areas NA (e.g., NA1 and NA2 in FIG. 11) of the printing image PI are printed by executing the partial printing SP three times. For example, in the printing mode for the chromatic colors, the three raster lines RLn1, RLn2, and RLn3 are formed continuously in the conveyance direction AR in the non-overlap area NA1 of FIG. 11. Each raster line is printed by executing the partial printing SP corresponding thereto once, and the corresponding partial printing SP is included in the partial printing SP executed three times in the head positions P1 to P3. For example, the chromatic color dots on the raster line RLn1 are formed by using a nozzle NZc1 corresponding thereto and positioned in the head position P1. The chromatic color dots on the raster line RLn2 are formed by using a nozzle NZc2 corresponding thereto and positioned in the head position P2. The chromatic color dots on the raster line RLn3 are formed by using a nozzle NZc3 corresponding thereto and positioned in the head position P3. That is, the conveyor 140 conveys the printing medium so that the first raster line RLn1 corresponds to the first nozzle, conveys the printing medium so that the second raster line RLn2 corresponds to the second nozzle, conveys the printing medium so that the third raster line RLn3 corresponds to the third nozzle, and then conveys the printing medium so that the first raster line RLn1 corresponds to the fourth nozzle. This inhibits the decrease in image quality compared to a case where the raster lines RLn1, RLn2, and RLn3 are formed only by the nozzle NZc1. For example, when the chromatic color dots on the raster line RLn1 are formed only by the nozzle NZc1 corresponding thereto and positioned in the head position P1 in a state where the nozzle NZc1 is clogged, ink is discharged on the raster lines RLn2 and RLn3 but no ink is discharged on the raster line RLn1. On the other hand, when the chromatic color dots on the raster line RLn1, the chromatic color dots on the raster line RLn2, and the chromatic color dots on the raster line RLn3 are formed only by the nozzle NZc1 in the state where the nozzle NZc1 is clogged, no ink is discharged on the raster lines RLn1, RLn2, and RLn3. When comparing the case where no ink is discharged only on the raster line RLn1 to the case where no ink is discharged on the raster lines RLn1, RLn2, and RLn3, color unevenness is conspicuous in the case where no ink is discharged on the raster lines RLn1, RLn2, and RLn3. Thus, when the nozzle NZc1 is clogged, the decrease in image quality when no ink is discharged on the raster line RLn1 is smaller than that when no ink is discharged on the raster lines RLn1, RLn2, and RLn3.

In the printing mode for the chromatic colors, the overlap areas SA (e.g., SA1 and SA2 of FIG. 11) of the printing image PI are printed by executing the partial printing SP six times. For example, the three raster lines RLs1, RLs2, and RLs3 are formed continuously in the conveyance direction AR in the overlap area SA1 of FIG. 11. Each raster line is printed by executing the partial printing SP corresponding thereto twice, and the corresponding partial printing SP is included in the partial printing SP executed six times in the head positions P1 to P6. For example, the raster line RLs1 is printed by the partial printing SP in the head position P1 and the partial printing SP in the head position P4. The raster line RLs2 is printed by the partial printing SP in the head position P2 and the partial printing SP in the head position P5. The raster line RLs3 is printed by the partial printing SP in the head position P3 and the partial printing SP in the head position P6. Thus, for example, the chromatic color dots on the raster line RLs1 are formed by using the nozzles NZc1 and NZd1 corresponding thereto and positioned in the head positions P1 and P4. The chromatic color dots on the raster line RLs2 are formed by using the nozzles NZc2 and NZd2 corresponding thereto and positioned in the head positions P2 and P5. The chromatic color dots on the raster line RLs3 are formed by using the nozzles NZc3 and NZd3 corresponding thereto and positioned in the head positions P3 and P6.

In the second embodiment, when the color printing image PI is printed by the printing mode C, the printing mode for the dots K is different from the printing mode for the chromatic color dots. Thus, the dot data generating process for the overlap area according to the second embodiment is different from that of the first embodiment. Any other processes than the above in the printing process according to the second embodiment are similar to those according to the first embodiment.

Figure 12:
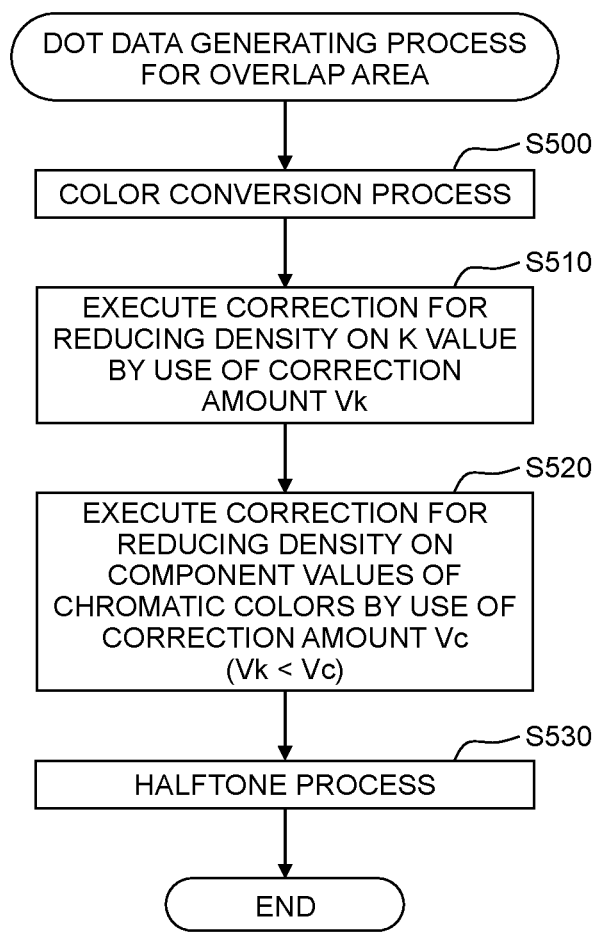
FIG. 12 is a flowchart of a dot data generating process for an overlap area according to the second embodiment.

FIG. 12 is a flowchart of a dot generating process for the overlap area according to the second embodiment. In S500, the CPU 210 executes the color conversion process on pieces of data included in the RGB image data and corresponding to the target raster line. Thus, values of pixels forming the target raster line are converted from RGB values to CMYK values.

In S510, the CPU 210 executes, on a K value included in the CMYK values of each pixel forming the target raster line, correction for reducing the density by use of a correction amount Vk. Specifically, a value obtained by multiplying the K value of each pixel by a coefficient (1−Vk) based on the correction amount Vk is determined as a K value after correction.

In S520, the CPU 210 executes, on component values of the chromatic colors included in the CMYK values of each pixel forming the target raster line, the correction for reducing the density by use of a correction amount Vc larger than the correction amount Vk. Specifically, values obtained by multiplying a C value, a M value, and a Y value of each pixel by a coefficient (1−Vc) based on the correction amount Vc are determined as a C value after correction, a M value after correction, and a Y value after correction.

In S530, the CPU 210 executes the halftone process on the CMYK values of each pixel forming the target raster line, and then ends the dot data generating process for the overlap area. Accordingly, the pieces of dot data of C, M, Y, and K are generated for the target raster line in the overlap area SA.

According to the second embodiment described above, the CPU 210 generates the dot data indicating the formation state of the dots K for each pixel and the pieces of dot data indicating the formation states of the chromatic color dots for each pixel, by using the RGB image data (S222, S224, S215 of FIG. 7, FIG. 12). The dots K and the chromatic color dots forming the raster lines in the non-overlap area NA are formed by one nozzle for each color corresponding to each raster line (FIG. 11). The dots K and the chromatic color dots forming the raster lines in the overlap area SA are formed by two nozzles for each color corresponding to each raster line. The CPU 210 executes the dot data generating process for the non-overlap area (S222, S224 of FIG. 7) on the pieces of partial image data included in the RGB image data and corresponding to the non-overlap area NA, thus generating the pieces of dot data included in the pieces of dot data indicating the printing image PI and corresponding to the non-overlap area NA. The CPU 210 executes the dot data generating process for the overlap area (S215 of FIG. 7, FIG. 12) on the pieces of partial image data included in the RGB image data and corresponding to the overlap area SA, thus generating the pieces of dot data included in the pieces of dot data indicating the printing image PI and corresponding to the overlap area SA. The printing mode for the chromatic color dots is the interlaced mode (FIG. 11) as follows. That is, three lines included in the raster lines in the non-overlap area NA are printed continuously in the conveyance direction AR by executing the partial printing three times. Each of the three raster lines is printed by executing the partial printing SP corresponding thereto once and the corresponding partial printing SP is included in the partial printing SP executed three times (FIG. 11). The printing mode for the dots K is the non-interlaced mode (FIG. 11) in which the raster lines in the non-overlap area NA are printed by executing the partial printing once. The degree in reduction of density of the image of the overlap area SA in the correction process (S520 of FIG. 12) executed when the pieces of dot data of the chromatic colors (CMY) corresponding to the overlap area SA are generated, is larger than that in the correction process executed when the dot data of the achromatic color K corresponding to the overlap area SA is generated (Vk<Vc). That is, in a case that the CPU 210 executes the correction process for the printing of the overlap area SA by using the first nozzle, the second nozzle, the third nozzle, and the fourth nozzle, the CPU 210 reduces ink consumption amount larger as compared with a case that the CPU 210 executes the correction process for the printing of the overlap area SA by using the fifth nozzles.

As described above, the degree of increase in density of the overlap area SA is larger as the time lag after the dot is formed by one nozzle before the dot is formed by another nozzle is longer. In the second embodiment, the number of times of the partial printing in which the raster lines in the overlap area SA are formed by the printing for the chromatic colors (six times (P1 to P6) in this embodiment) is larger than the number of times N of the partial printing in which the raster lines in the overlap area SA are formed by the printing for the achromatic color K (twice (P1 and P4) in this embodiment). Thus, the density of the overlap area SA in the printing for the chromatic colors is likely to be higher than that in the printing for the achromatic color K.

For example, in the printing for the chromatic colors, the dots in the overlap area SA are formed by executing the partial printing six times in the head positions P1 to P6. Thus, the time lag described above may be, at a maximum, a period from the first partial printing in the head position P1 to the sixth partial printing in the head position P6. For example, the time lag between the dot formed by the nozzle NZc1 in the head position P1 of FIG. 11 and the dot formed by a nozzle NZd4 in the head position P6 of FIG. 11 is the maximum time lag, but these dots may overlap with each other in the conveyance direction AR. On the other hand, in the printing for the achromatic color K, since the dots in the overlap area SA are formed by executing the partial printing twice in the head positions P1 and P4, the time lag described above is fixed, that is, a period from the first partial printing in the head position P1 to the fourth partial printing in the head position P4.

As described above, the time lag in the printing for the chromatic colors is partially larger than that in the printing for the achromatic color K. As a result, the density of the image using the chromatic colors included in the image of the overlap area SA is likely to be higher than the density of the image using the achromatic color K included in the image of the overlap area SA. In this embodiment, the degree in reduction of density in the process for generating the pieces of dot data of the chromatic colors is larger than that in the process for generating the dot data of the achromatic color K. The printer 200 can thus print the image of the overlap area SA at an appropriate density depending on the printing mode for the chromatic color dots and the printing mode for the achromatic color K. It is thus possible for the printer 200 to efficiently inhibit the color unevenness between the overlap area SA and the non-overlap area NA depending on the printing mode for the chromatic colors and the printing mode for the achromatic color K.

In the printing head 110b of this embodiment, the nozzle interval NTc of the nozzles from which chromatic color inks are discharged is longer than the nozzle interval NTk of the nozzles from which the ink K is discharged. In such a printer 200, the printing image PI can be printed appropriately by adopting the printing mode C (FIG. 11) in which the printing mode for the chromatic color dots is different from the printing mode for the dots K. In this embodiment, the printer 200 can efficiently inhibit the color unevenness which may be otherwise caused between the overlap area SA and the non-overlap area NA.

In this embodiment, the CPU 210 generates the pieces of dot data (S530 of FIG. 12) by obtaining the pieces of CMYK image data that include the color values of the CMYK color system for each pixel (S500 of FIG. 12), executing the correction process (S510, S520 of FIG. 12) on the pieces of CMYK image data, and executing the halftone process on the pieces of CMYK image data after correction. The pieces of CMYK image data indicate the densities of C, M, Y, and K to be printed. It is thus possible to appropriately change the degree of correction for the chromatic colors (CMY) and the degree of correction for the achromatic color K by executing the correction process on the pieces of CMYK image data.

As understood from the above explanation, the chromatic colors (CMY) of the second embodiment are an exemplary first color, and the achromatic color K is an exemplary second color.

Modified Examples (1) In each of the above embodiments, the printer 200 is the serial printer including the main-scan section 130. Instead of this, the printer may be so-called a line printer not including the main-scan section. FIG. 13 illustrates a modified example. The Y direction in FIG. 13 is a conveyance direction ARv of the sheet M. A printing head 110v of FIG. 13 is a printing head for printing a monochrome image by using the ink K. The printing head 110v of the line printer includes nozzles NZv arranged in the X direction, which intersects with the conveyance direction ARv, over substantially the same length as a width in the X direction of the sheet M. That is, the conveyor 140 moves the sheet M relative to the printing head 110d in a direction intersecting with the arrangement direction of the nozzles NZd.

The printing head 110v includes three head units HU1 to HU3. The head units HU1 to HU3 have different positions in the X direction. The head units HU1 to HU3 are arranged from an upstream side in the X direction in this order. The two head units HU1 and HU3 have the same position in the Y direction. The position in the Y direction of the head units HU1 and HU3 is different from the position in the Y direction of the head unit HU2. Part of the head unit HU1 including a downstream end in the X direction overlaps in the X direction with part of the head unit HU2 including an upstream end in the X direction. Part of the head unit HU2 including a downstream end in the X direction overlaps in the X direction with part of the head unit HU3 including an upstream end in the X direction. Each of the head units HU1 to HU3 includes a nozzle row formed by nozzles NZv for the ink K.

FIG. 13 depicts an example of a printing image PIv to be printed on the sheet M. The line printer forms dots on the sheet M by discharging ink from the printing head 110v on the sheet M conveyed in the conveyance direction ARv. The printing image PIv is thus printed. The printing image PIv includes raster lines RLv (e.g., RLv1 and RLv2 in FIG. 13) extending in the Y direction of FIG. 13 (conveyance direction ARv at the time of printing) and having different positions in the X direction. Each raster line RLv is a line in which dots may be formed.

The printing image PIv includes non-overlap areas NAv (e.g., areas NAv1 to NAv3 not hatched in FIG. 13) and overlap areas SAv (e.g., areas SAv1 and SAv2 hatched in FIG. 13).

Each raster line RLv of the non-overlap area NAv (e.g., RLv1 of FIG. 13) corresponds to one nozzle NZv. That is, dots of the ink K in each raster line RLv of the non-overlap area NAv are formed by one nozzle NZv.

Each raster line RLv of the overlap area SAv (e.g., RLv2 of FIG. 13) corresponds to two nozzles NZv. That is, the dots of the ink K in each raster line RLv of the overlap area SAv are formed by the two nozzles NZv.

As described above, providing the overlap area SAv between two non-overlap areas NAv in the printing head 110v of the line printer inhibits a white streak and a black streak which may be otherwise caused at a boundary between the head units in the printing image PIv.

In the line printer, the overlap area SAv has the time lag between the timing at which the dot is formed by one nozzle and the timing at which the dot is formed by another nozzle. Thus, in the printing image PIv, the density of the image of the overlap area SAv is likely to be higher than the density of the image of the non-overlap area NAv. In order to inhibit this problem, the dot data generating process for the overlap area (FIG. 8) similar to the first embodiment may be executed also in the line printer when pieces of dot data corresponding to the overlap area SAv are generated. The dot data generating process for the non-overlap area (S222, S224 of FIG. 7) similar to the first embodiment may be executed when pieces of dot data corresponding to the non-overlap area NAv are generated. In this case, the correction amount in the dot data generating process for the overlap area may be changed, for example, depending on resolution in the conveyance direction AR. For example, assuming that the line printer can execute a printing mode in which the resolution in the conveyance direction AR is 300 dpi and a printing mode in which the resolution in the conveyance direction AR is 600 dpi. In this case, since the relative dot diameter Rre and the interval ratio SR depend on the printing mode, it is preferable that the correction amount for reducing the density of the image of the overlap area SA is changed depending on the relative dot diameter Rre and the interval ratio SR, similar to the first embodiment. This inhibits the color unevenness between the overlap area SAv and the non-overlap area NAv from being conspicuous.

(2) In the dot data generating process for the overlap area according to each of the embodiments (FIG. 8 and FIG. 12), the correction amount is changed depending on the printing mode. In the first embodiment, the density of the image of the overlap area SA in the printing mode A is likely to be higher than that in the printing mode B. Thus, the correction for reducing the density of the image of the overlap area SA may be executed in the printing mode A, and such correction may not be executed in the printing mode B. In the second embodiment, the density of the image of the overlap area SA using the chromatic colors is likely to be higher than that using the achromatic color K. Thus, the correction for reducing the density of the image of the overlap area SA may be executed on the component values of the chromatic values, and such correction may not be executed on the value of the achromatic color K.

(3) The printing modes A and B of the first embodiment are examples. The present disclosure, however, is not limited thereto. Any other two or more printing modes, in which at least one of the relative dot diameter Rre and the interval ratio SR have mutually different values, may be adopted. For example, two printing modes in which the relative dot diameters Rre are different from each other may be adopted. In the two printing modes, the resolution is the same, but maximum dot diameters are different from each other. In this case, in the dot data generating process for the overlap area, the correction amount for the printing mode having a larger relative dot diameter Rre preferably has a value larger than the correction amount for the printing mode having a smaller relative dot diameter Rre. Alternatively, two printing modes having the same resolution in the conveyance directions AR and different resolutions in the main-scan direction may be adopted. The two printing modes have different interval ratios SR because of the different resolutions in the main-scan direction. Thus, in the dot data generating process for the overlap area of this case, the correction amount for the printing mode in which the interval ratio SR is closer to 1 preferably has a value smaller than the correction amount for the printing mode in which the interval ratio SR is further away from 1.

The interlaced mode, like the printing mode for CMY of the second embodiment, may be adopted as the printing mode of the first embodiment. In the interlaced mode, the partial printing is executed three times and each of the three raster lines is printed by executing the corresponding partial printing once so that the three raster lines are formed continuously in the conveyance direction AR in the non-overlap area NA. As the printing mode of the first embodiment, the following printing mode may be typically adopted. That is, the partial printing is executed L times to form L pieces of line (L is an integer equal to or more than 1) continuously in the conveyance direction AR in the non-overlap area NA. Each of the lines is printed by executing the corresponding partial printing once. In this general definition, L=1 means the non-interlaced mode, for example, the printing mode A of the first embodiment and the printing mode for the dots K of the second embodiment. Further, L≥2 means the interlaced mode, for example, the printing mode B (L=2) of the first embodiment and the printing mode (L=3) for the chromatic color dots of the second embodiment.

(4) The printing mode for the dots K and the printing mode for the chromatic color dots in the second embodiment are examples, and the present disclosure is not limited thereto. For example, when the nozzle interval NTk of the nozzles for the achromatic color K is half of the nozzle interval NTc of the nozzles for the chromatic colors, the interlaced mode satisfying L=2 may be adopted as the printing mode for the dots K, and the interlaced mode satisfying L=4 may be adopted as the printing mode for the chromatic color dots.

(5) In the second embodiment, the printing mode for the dots K is different from the printing mode for the chromatic color dots. The present disclosure, however, is not limited thereto. For example, the printing mode for the dots C may be different from the printing mode for dots M depending on the configuration of the printing head such as the nozzle interval. In this case, in the dot data generating process for the overlap area (FIG. 12), the correction amount of the C value included in the CMYK values may be different from the correction amount of the M value included in the CMYK values.

(6) In the dot data generating process for the overlap area according to the first embodiment (FIG. 8), the correction amount for the pixel corresponding to the dot to be formed first from among the dots forming each target raster line is different from the correction amount for the pixel corresponding to the dot formed later from among the dots forming each target raster line. The present disclosure, however, is not limited thereto. The correction amount for the pixel corresponding to the dot to be formed first may be the same as the correction amount for the pixel corresponding to the dot to be formed later.

(7) In the dot data generating process for the overlap process according to each of the embodiments, the correction process (S450 of FIGS. 8, S510 and S520 of FIG. 12) is executed on the pieces of CMYK image data after the color conversion process. The present disclosure, however, is not limited thereto. The correction process for reducing the density may be executed on the RGB image data before the color conversion process. Alternatively, for example, in the color conversion process of the dot data generating process for the overlap area, the correction for reducing the density may be executed by using a look up table for the overlap area, which is obtained by executing adjustment in which RGB values are converted to CMYK values having a lower density than the normal look up table. Or, in the halftone process of the dot data generating process for the overlap area, the correction for reducing the density may be executed by using, for example, a value that indicates a density higher than the normal, as a relative density value of the dot to be used for error diffusion.

(8) In the dot data generating process for the overlap area (FIG. 8, FIG. 12) in each of the embodiments, when the density of the image of the overlap area SA is reduced, the correction for reducing the density is executed on the entire overlap area SA. The present disclosure, however, is not limited thereto. The correction may be executed on part of the overlap area SA in the dot data generating process for the overlap area. For example, the correction may not be executed on a center portion of the overlap area SA in the conveyance direction AR, and the correction may be executed on the vicinities of upstream end downstream ends of the overlap area SA so that the correction amount is increased gradually toward the upstream and downstream ends in the conveyance direction AR that are adjacent to the non-overlap areas NA. According to this modified example, the color unevenness between the overlap area SA and the non-overlap area NA can be inhibited only by correcting the part(s) of the overlap area SA. Further, since only the part(s) of the overlap area SA is/are corrected, the correction is not likely to excessively change the overall color of the image of the overlap area SA.

(9) In the dot data processing process for the non-overlap area (S222, S224 of FIG. 7) according to each of the embodiments, the correction for reducing the density is not executed on the non-overlap area NA. The present disclosure, however, is not limited thereto. The correction may be executed on the vicinities of the upstream and downstream ends of the non-overlap area NA that are adjacent to the overlap areas SA. That is, the correction for reducing the density may be executed on the overlap areas SA and the ends of the non-overlap area NA that are adjacent to the overlap areas SA. In this case, for example, the correction amount for the non-overlap area NA (the degree of reduction in density) may be smaller than that for the overlap area SA. According to this modified example, it is possible to inhibit the color unevenness at the boundary between the overlap area SA and the non-overlap area NA, thus inhibiting a streak at the boundary between the overlap area SA and the non-overlap area NA.

(10) Instead of the sheet M, any other medium, such as OHP films, CD-ROM, or DVD-ROM, may be adopted as the printing medium.

(11) In the printing mechanism 100 of the above embodiment, the conveyor 140 conveys the sheet M so that the sheet M is moved in the conveyance direction relative to the printing head 110. Instead of this configuration, the conveyor 140 may be configured to move the printing head 110 in a direction opposite to the conveyance direction AR relative to the fixed sheet M such that the sheet M is moved in the conveyance direction AR relative to the printing head 110.

(12) In each of the embodiments, the apparatus that executes the printing process of FIG. 3 is the printer 200. The present disclosure, however, is not limited thereto. A terminal apparatus, such as a personal computer, connected to the printer 200 may execute the printing process of FIG. 3. In this case, the CPU of the terminal apparatus executes the printing process of FIG. 3 for example, by executing a printer driver program. In this case, the CPU of the terminal apparatus causes the printer 200 as the print execution section to execute printing by transmitting the pieces of partial printing data to the printer 200 in S235 of FIG. 7.

The apparatus that executes the printing process of FIG. 3 may be a server that obtains image data from the printer or the terminal apparatus and generates a printing job by use of the image data. The server may be calculators that communicate with each other via a network.

(13) In each of the above embodiments, part of the configurations achieved by hardware may be replaced by software, or part or all of the configurations achieved by software may be replaced by hardware. For example, when the printer 200 executes the printing process of FIG. 3, the halftone process and/or the color conversion process may be achieved, for example, by a dedicated hardware circuit (e.g., ASIC) that operates in accordance with an instruction of the CPU 210 of the printer 200.

The present disclosure is explained above based on the embodiments and the modified examples. The embodiments and the modified examples described above are provided to facilitate understanding of the present disclosure, and the present disclosure is not limited to those. The present disclosure may be changed or modified without departing from the gist and the scope of the claims below, and includes equivalents thereof.

What is claimed is:
1. A printing apparatus, comprising:
a print execution section; and
a controller,
wherein the print execution section includes:
  a printing head having a plurality of nozzles arranged in a first direction, an ink having a specified color being discharged from the nozzles;
  a head driver configured to drive the printing head to form a plurality of dots having the specified color on a printing medium by discharging the ink having the specified color from the nozzles; and
  a movement mechanism configured to move the printing medium relative to the printing head in any of the first direction and a second direction intersecting with the first direction,
wherein the controller is configured to:
  obtain a piece of object image data;
  generate, by using the object image data, a plurality of pieces of dot data indicating formation states of the dots having the specified color, for a plurality of pixels; and
  print a printing image by causing the print execution section to execute discharge of the ink having the specified color and movement of the printing medium by use of the pieces of dot data,
the printing image includes a plurality of raster lines, each of the raster lines including a part of the dots having the specified color, the part of the dots being arranged in the second direction,
the printing image includes two first areas and a second area positioned between the two first areas, the raster lines include a plurality of first raster lines included in each of the two first areas and a plurality of second raster lines included in the second area, the part of the dots having the specified color and forming each of the first raster lines are formed by one nozzle included in the nozzles and corresponding to each of the first raster lines, the part of the dots having the specified color and forming each of the second raster lines are formed by two or more nozzles included in the nozzles and corresponding to each of the second raster lines, the controller is configured to:
  execute a first area process on a piece of first partial image data included in the object image data and corresponding to the first area, to generate a plurality of pieces of first partial dot data included in the pieces of dot data and corresponding to each of the two first areas, and
  execute a second area process on a piece of second partial image data included in the object image data and corresponding to the second area, to generate a plurality of pieces of second partial dot data included in the pieces of dot data and corresponding to the second area, in the second area process, the pieces of second partial dot data are generated so that an image of the second area is printed at a density equal to or less than a density in a case that the first area process is executed on the second partial image data, the controller is configured to control the print execution section to print the printing image by a first printing mode and by a second printing mode, a relative dot diameter of the second printing mode is larger than a relative dot diameter of the first printing mode, the relative dot diameter is a ratio of a diameter of a maximum dot having the specified color to a minimum dot interval, the minimum dot interval indicating a smaller one of a dot interval in the first direction and a dot interval in the second direction, the dot intervals in the first and second directions being based on printing resolution, and in a case that the controller executes the second area process for the printing by the second printing mode, the controller is configured to lower the density of the image in the second area larger as compared with a case that the controller executes the second area process for the printing by the first printing mode.

2. The printing apparatus according to claim 1, wherein an interval ratio of the first printing mode is closer to 1 than an interval ratio of the second printing mode, the interval ratio being a ratio of the dot interval in the second direction to the dot interval in the first direction.

3. A printing apparatus, comprising:
a print execution section; and
a controller,
wherein the print execution section includes:
  a printing head having a plurality of nozzles arranged in a first direction, an ink having a specified color being discharged from the nozzles;
  a head driver configured to drive the printing head to form a plurality of dots having the specified color on a printing medium by discharging the ink having the specified color from the nozzles; and
  a movement mechanism configured to move the printing medium relative to the printing head in any of the first direction and a second direction intersecting with the first direction, wherein the controller is configured to:
  obtain a piece of object image data;
  generate, by using the object image data, a plurality of pieces of dot data indicating formation states of the dots having the specified color for a plurality of pixels; and
  print a printing image by causing the print execution section to execute discharge of the ink having the specified color and movement of the printing medium by use of the pieces of dot data, the printing image includes a plurality of raster lines, each of the raster lines including a part of the dots having the specified color, the part of the dots being arranged in the second direction, the printing image includes two first areas and a second area positioned between the two first areas, the raster lines include a plurality of first raster lines included in each of the two first areas and a plurality of second raster lines included in the second area, the part of the dots having the specified color and forming each of the first raster lines are formed by one nozzle included in the nozzles and corresponding to each of the first raster lines, the part of the dots having the specified color and forming each of the second raster lines are formed by two or more nozzles included in the nozzles and corresponding to each of the second raster lines, the controller is configured to:
  execute a first area process on a piece of first partial image data included in the object image data and corresponding to the first area, to generate a plurality of pieces of first partial dot data included in the pieces of dot data and corresponding to each of the two first areas; and
  execute a second area process on a piece of second partial image data included in the object image data and corresponding to the second area, to generate a plurality of pieces of second partial dot data included in the pieces of dot data and corresponding to the second area, in the second area process, the pieces of second partial dot data are generated so that an image of the second area is printed at a density equal to or less than a density in a case that the first area process is executed on the second partial image data, the controller is configured to control the print execution section to print the printing image by a first printing mode and control the print execution section to print the printing image by a second printing mode, an interval ratio of the first printing mode is closer to 1 than an interval ratio of the second printing mode, the interval ratio being a ratio of a dot interval in the second direction to a dot interval in the first direction, the dot intervals in the first and second directions being based on printing resolution, and in a case that the controller executes the second area process for the printing by the second printing mode, the controller is configured to lower the density of the image in the second area larger as compared with a case that the controller executes the second area process for the printing by the first printing mode.

4. The printing apparatus according to claim 3,
wherein the print execution section further includes a main-scan mechanism configured to execute main-scan by which the printing head is moved in the second direction relative to the printing medium,
the movement mechanism is a sub-scan mechanism configured to execute sub-scan by which the printing medium is moved in the first direction relative to the printing head,
the controller is configured to print the printing image by causing the print execution section to execute, a plurality of times, partial printing and the sub-scan by use of the pieces of dot data, the partial printing being printing in which the ink having the specified color is discharged from the printing head during the main-scan,
a part of the dots having the specified color and forming each of the first raster lines in the first area are formed by executing the partial printing once, and
another part of the dots having the specified color and forming each of the second raster lines in the second area are formed by executing the partial printing twice or more.

5. The printing apparatus according to claim 4,
wherein in the first printing mode, each of n pieces (n is an integer equal to or more than 2) of line that are included in the first raster lines in the first area and that are arranged in the first direction is printed by executing one of n numbers of the partial printing corresponding to the n pieces of line, and
in the second printing mode, each of m pieces (m is an integer equal to or more than 1 and less than n) of line that are included in the first raster lines in the first area and that are arranged in the first direction is printed by executing one of m numbers of the partial printing corresponding to the m pieces of line.

6. The printing apparatus according to claim 4, wherein the dot interval in the first direction in the second printing mode is larger than the dot interval in the first direction in the first printing mode.

7. The printing apparatus according to claim 3,
wherein the object image data includes color values of a specified color system for each of the pixels, the specified color system including one or more components that correspond(s) to one or more kinds of inks used for the printing by the print execution section,
the second area process executed in the printing by the second printing mode includes:
  a correction process of correcting, from among the color values of each of the pixels included in the second partial image data, a value of a component that corresponds to the ink having the specified color; and
  a process of generating the pieces of second partial dot data by executing a halftone process on the second partial image data after correction.

8. The printing apparatus according to claim 3,
wherein the second area process includes a process of lowering the density of the image in the second area, so that density of a first dot is lowered larger as compared with density of a second dot,
wherein the first dot and the second dot are included in the part of the dots having the specified color and forming each of the second raster lines, and
wherein the second dot is formed after the first dot has been formed.

9. The printing apparatus according to claim 8,
wherein the object image data includes color values of a specified color system for each of the pixels, the specified color system including one or more components that correspond(s) to one or more kinds of inks used for the printing by the print execution section,
the second area process includes:
  a correction process of correcting, from among the color values of each of the pixels included in the second partial image data, at least a value of a component that corresponds to the ink having the first color, and
  a process of generating the pieces of second partial dot data of the first color and the pieces of second partial dot data of the second color, by executing a halftone process on the second partial image data after correction.

10. The printing apparatus according to claim 3,
wherein the printing head includes a first nozzle, a second nozzle, a third nozzle, and a fourth nozzle from which an ink having a first color is discharged and a plurality of fifth nozzles from which an ink having a second color is discharged,
the first nozzle, the second nozzle, the third nozzle, and the fourth nozzle are arranged in this order in the first direction,
the fifth nozzles are arranged in the first direction,
in the printing head, an interval in the first direction between the first nozzle and the second nozzle is longer than an interval in the first direction between the fifth nozzles, an interval in the first direction between the second nozzle and the third nozzle is longer than the interval in the first direction between the fifth nozzles, and an interval in the first direction between the third nozzle and the fourth nozzle is longer than the interval in the first direction between the fifth nozzles,
the second area includes a first raster line, a second raster line, and a third raster line that are adjacent to each other in the first direction,
the movement mechanism is configured to move the printing medium so that the first nozzle corresponds to the first raster line, move the printing medium so that the second nozzle corresponds to the second raster line, move the printing medium so that the third nozzle corresponds to the third raster line, and then move the printing medium so that the fourth nozzle corresponds to the first raster line, and
in a case that the controller executes the second area process for the printing of the second area by using the first nozzle, the second nozzle, the third nozzle, and the fourth nozzle, the controller is configured to lower the density of the image in the second area larger as compared with a case that the controller executes the second area process for the printing of the second area by using the fifth nozzles.

11. The printing apparatus according to claim 10, wherein the first color is a chromatic color and the second color is a black color.

12. A printing apparatus, comprising:
a head configured to discharge ink; and
a controller,
wherein the controller is configured to execute:
  an image obtaining process of obtaining an object image including a first partial image and a second partial image;
  a printing process of printing an overlap area and a non-overlap area, the overlap area being included in the first partial image and overlapping with the second partial image, the non-overlap area being included in the first partial image and not overlapping with the second partial image; and a correction process of correcting a density of the overlap area by reducing a consumption amount of the ink in the overlap area, wherein the controller is configured to control the head by a first printing mode and by a second printing mode to execute printing, wherein printing resolution of the first printing mode is higher than printing resolution of the second printing mode, wherein in a case that the controller executes the correction process for the printing by the second printing mode, the controller is configured to reduce the consumption amount of the ink in the overlap area larger as compared with a case that the controller executes the correction process for the printing by the first printing mode.

13. The printing apparatus according to claim 12, wherein in a case that the controller executes the printing process by the first printing mode, the controller is configured to discharge the ink having a first dot diameter, and in a case that the controller executes the printing process by the second printing mode, the controller is configured to discharge the ink having a second dot diameter that is larger than the first dot diameter.

14. The printing apparatus according to claim 13, wherein the head includes a plurality of nozzles arranged in a first direction, and a ratio of the second dot diameter to a minimum dot interval is larger than a ratio of the first dot diameter to the minimum dot interval, the minimum dot interval indicating a smaller one of a dot interval in the first direction and a dot interval in the second direction, the dot intervals in the first and second directions being based on the printing resolution.

15. The printing apparatus according to claim 12, wherein the head includes a plurality of nozzles arranged in a first direction, and an interval ratio of the second printing mode is closer to 1 than an interval ratio of the first printing mode, the interval ratio being a ratio of a dot interval in a second direction, which intersects with the first direction, to a dot interval in the first direction.

16. The printing apparatus according to claim 12, further comprising a conveyor configured to convey a printing medium, wherein the head includes a first nozzle, a second nozzle, a third nozzle, and a fourth nozzle from which an ink having a first color is discharged and a plurality of fifth nozzles from which an ink having a second color is discharged, the first nozzle, the second nozzle, the third nozzle, and the fourth nozzle are arranged in this order in a first direction, the fifth nozzles are arranged in the first direction, in the head, an interval in the first direction between the first nozzle and the second nozzle is longer than an interval in the first direction between the fifth nozzles, an interval in the first direction between the second nozzle and the third nozzle is longer than the interval in the first direction between the fifth nozzles, and an interval in the first direction between the third nozzle and the fourth nozzle is longer than the interval in the first direction between the fifth nozzles, the overlap area includes a first raster line, a second raster line, and a third raster line that are adjacent to each other in the first direction, the conveyor is configured to convey the printing medium so that the first nozzle corresponds to the first raster line, convey the printing medium so that the second nozzle corresponds to the second raster line, convey the printing medium so that the third nozzle corresponds to the third raster line, and then convey the printing medium so that the fourth nozzle corresponds to the first raster line, and in a case that the controller executes the correction process for the printing of the overlap area by using the first nozzle, the second nozzle, the third nozzle, and the fourth nozzle, the controller is configured to reduce the consumption amount of the ink larger as compared with a case that the controller executes the correction process for the printing of the overlap area by using the fifth nozzles.

17. The printing apparatus according to claim 12, wherein in a case that the controller executes the correction process for the printing of the overlap area, the controller is configured to reduce an amount of the ink used for a first dot larger as compared with an amount of the ink used for a second dot to be formed after the first dot has been formed.

* * * * *

UNITED STATES PATENT AND TRADEMARK OFFICE
CERTIFICATE OF CORRECTION

| | |
|---|---|
| PATENT NO. | : 11,554,583 B2 |
| APPLICATION NO. | : 17/199556 |
| DATED | : January 17, 2023 |
| INVENTOR(S) | : Satoru Arakane |

It is certified that error appears in the above-identified patent and that said Letters Patent is hereby corrected as shown below:

In the Claims

Column 32, Claim 9, Line 12 should read:
component that corresponds to the ink having a Column 32, Claim 9, Line 15 should read:
dot data of a second color, by executing a halftone Signed and Sealed this
Tenth Day of October, 2023

Katherine Kelly Vidal
*Director of the United States Patent and Trademark Office*